United States Patent [19]
Jacob et al.

[11] 3,794,773
[45] Feb. 26, 1974

[54] SYNCHRONIZING UNIT

[75] Inventors: Jean-Baptiste Jacob, Quay-Perrous-Guirec; Roger Renoulin; Jean Guezou, both of Lannion, all of France

[73] Assignees: Societe Lannionnaise D'Electronique, Lannion, France; Compagnie Industrielle Des Telecommunications, Paris, France

[22] Filed: June 30, 1972

[21] Appl. No.: 268,090

[30] Foreign Application Priority Data

June 30, 1971 France .............................. 7124027

[52] U.S. Cl. .......................... 179/15 BS, 178/69.5 R
[51] Int. Cl. .............................................. H04j 3/06
[58] Field of Search ............ 179/15 BS; 178/69.5 R

[56] References Cited

UNITED STATES PATENTS 3,662,114 5/1972 Clark .............................. 179/15 BS

*Primary Examiner*—Ralph D. Blakeslee
*Attorney, Agent, or Firm*—Craig and Antonelli

[57] ABSTRACT

A synchronizing unit for a time switching apparatus employs respective synchronizing elements for synchronizing communication time channels of multiplexed data signals. Both frame and multi-frame sync recognition detection is effected on the basis of predetermined synchronizing time channels allotted within a frame. Speech channel and data signaling channel synchronization are also carried out on the basis of channel coding, so as to totally synchronize the data signals with the local clock of the time switching apparatus.

15 Claims, 22 Drawing Figures

SYNCHRONIZING UNIT

The present invention relates to a synchronizing unit in a time-switching center and comprises synchronizing devices, with the local clock of the distant time channels transmitted in the direction of the local time-switching center. The synchronizing unit according to the invention synchronizes the speech channels as well as the signalling channels used for monitoring the speech channels. Further, on a line, speech channels are essentially transmitted, but signalling channels and channels reserved for synchronizing are also transmitted.

Each of the various time-switching centers which constitute the nodes of an integrated system using pulse code modulation connections has its own local clock, and it is technologically impossible for the clocks, as a whole, to be perfectly synchronized. This is due, in a very diagrammatic way, to two phenomena. The first is the clock deviation phenomenon, the second being the little-known "jig" phenomenon. The "jig" phenomenon is a fault brought about by digital transmission, consisting of interference modulation of the position of the instants at which the pulses are centered. That is why, before a time-switching center is in a position to process data items coming from a distant center or from a satellite unit, it is necessary to resynchronize, with the local clock $\omega$, the in-coming data items in phase with the distant clock $\omega^a$.

The present invention has for its object a synchronizing device for speech channels and signalling channels, in an integrated time-switching network between two time-switching centers, or else between a time-switching center and the various distant or local satellite units of the center.

The present invention also has for an object a synchronizing device ensuring perfect transmission of speech channels, without loss of data.

The present invention has for another object a synchronizing device which is particularly well-adapted, by the synchronizing of the signalling channels, to good monitoring of the speech channels, as a whole.

An example of an embodiment of the invention which has no limiting character is described herebelow purely by way of illustration, with reference to the accompanying drawing, in which.

Figure 3A:
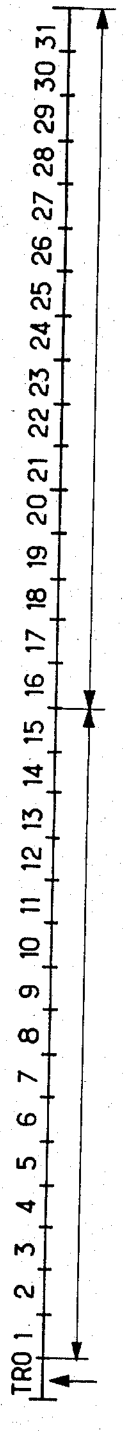
Figure 3B:
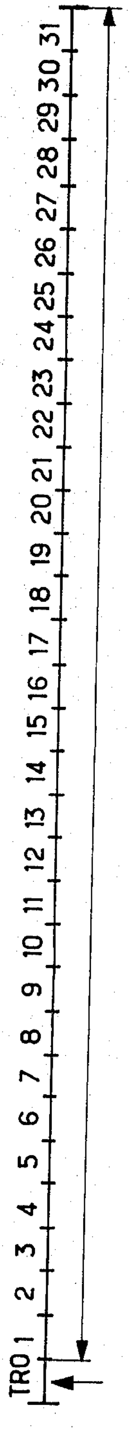
Figure 3C:
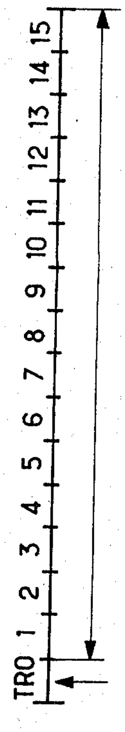
Figure 4:
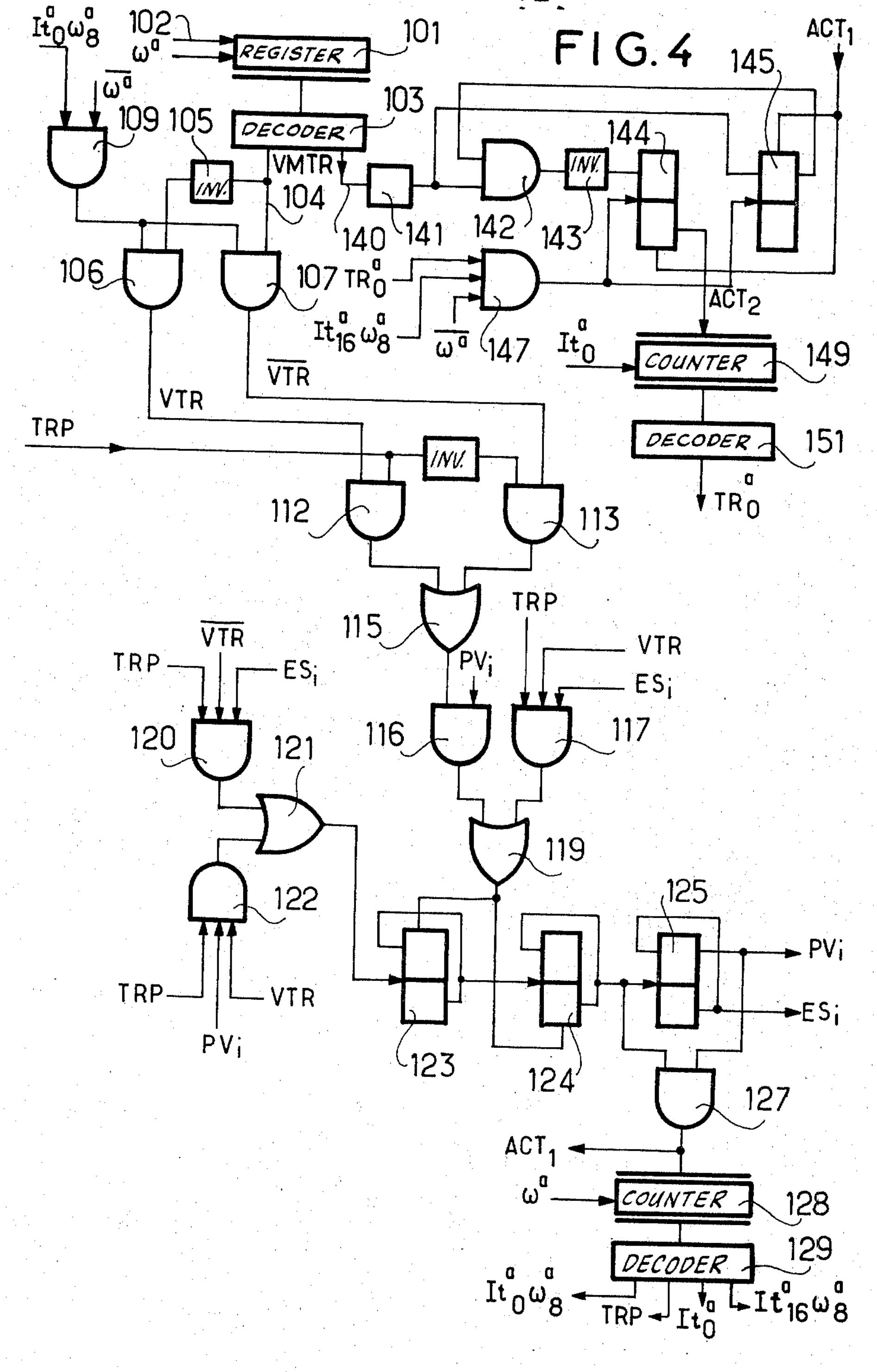
Figure 5A:
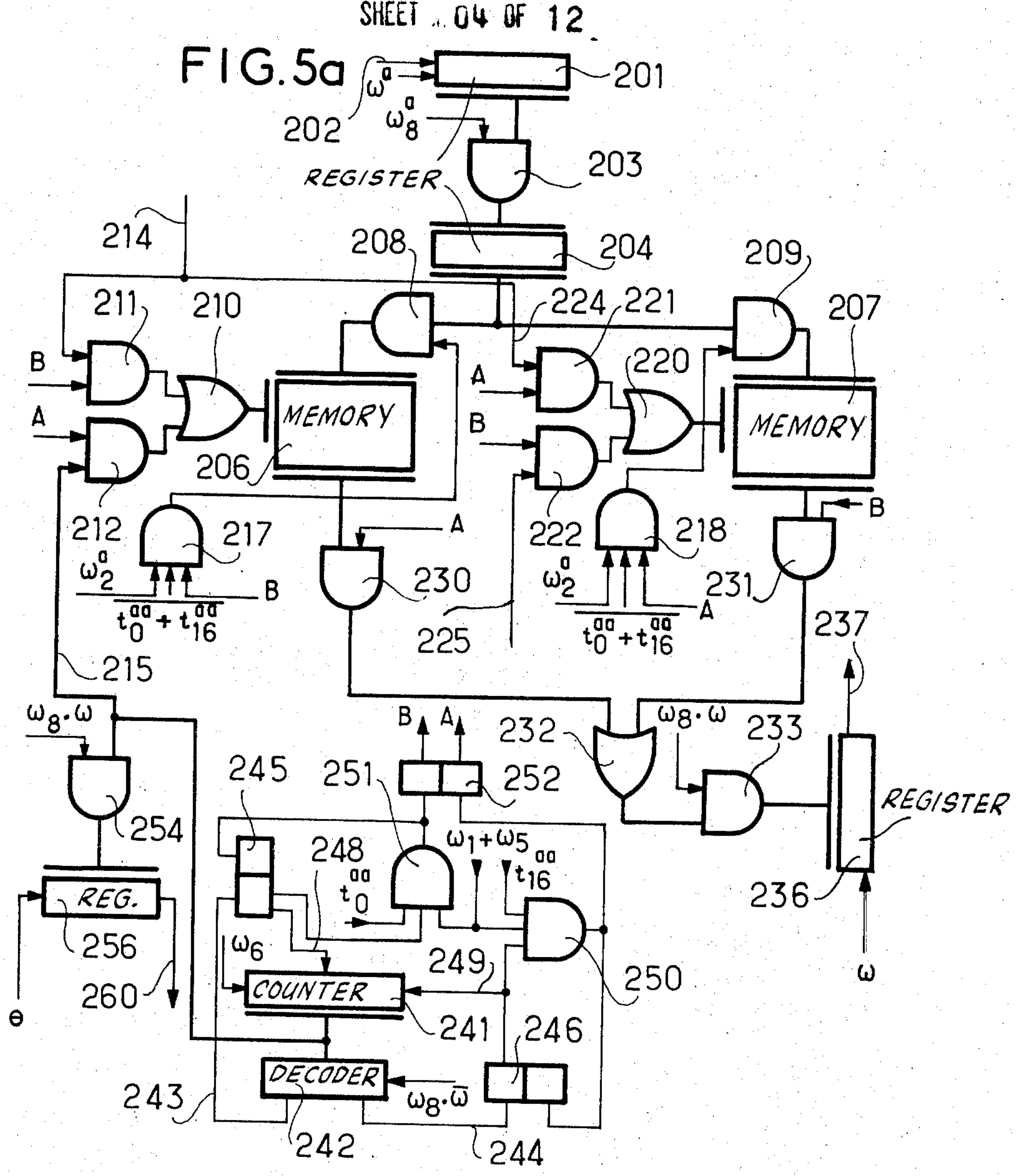
Figure 5B:
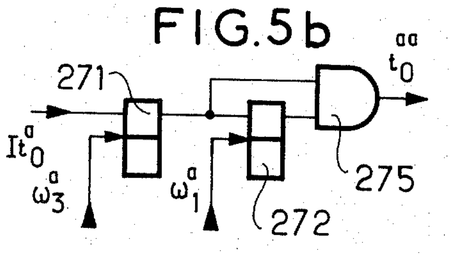
Figure 5C:
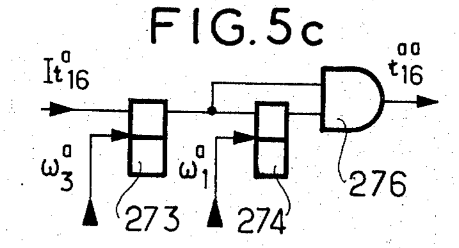
Figure 6A:
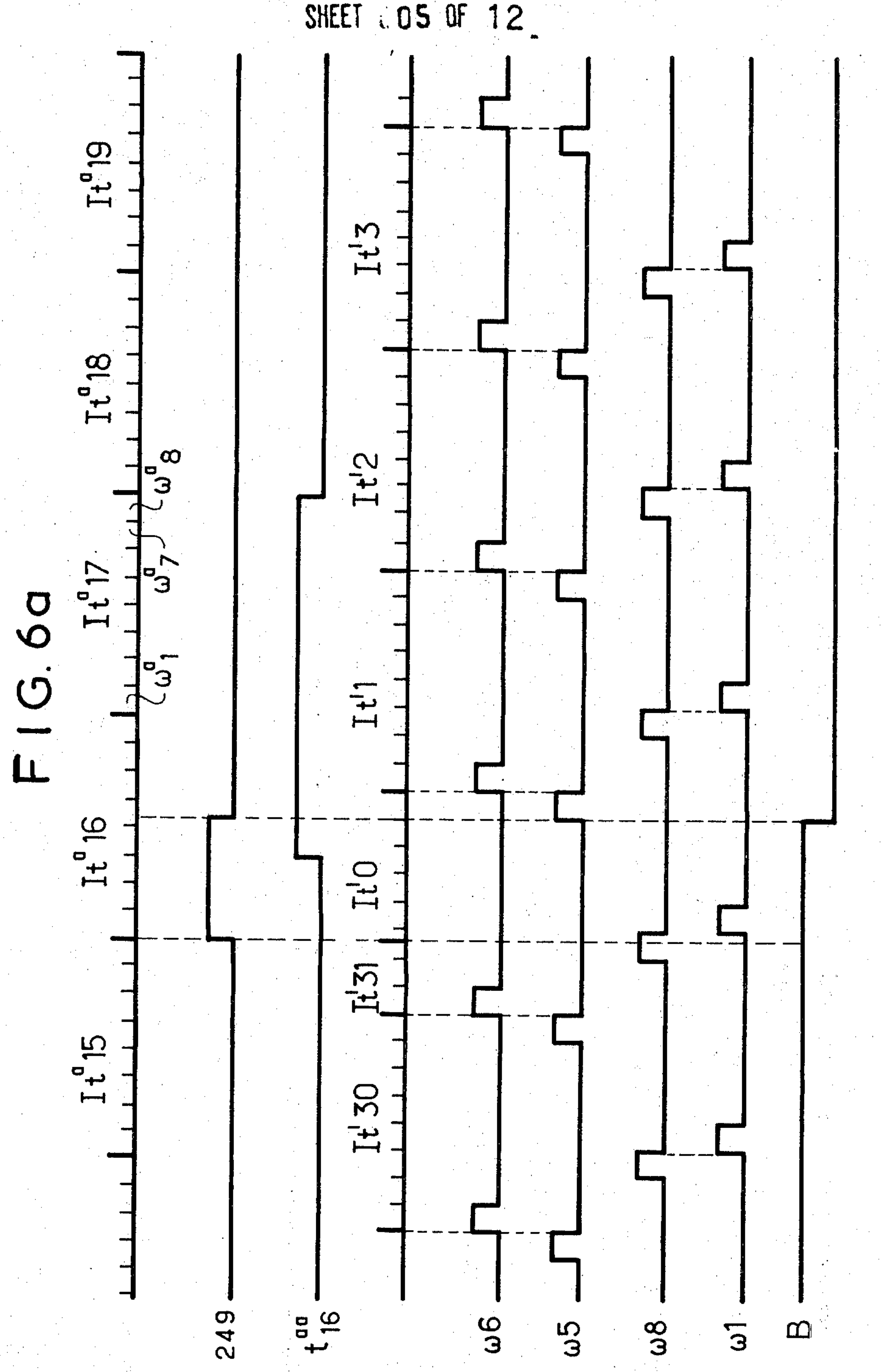
Figure 6B:
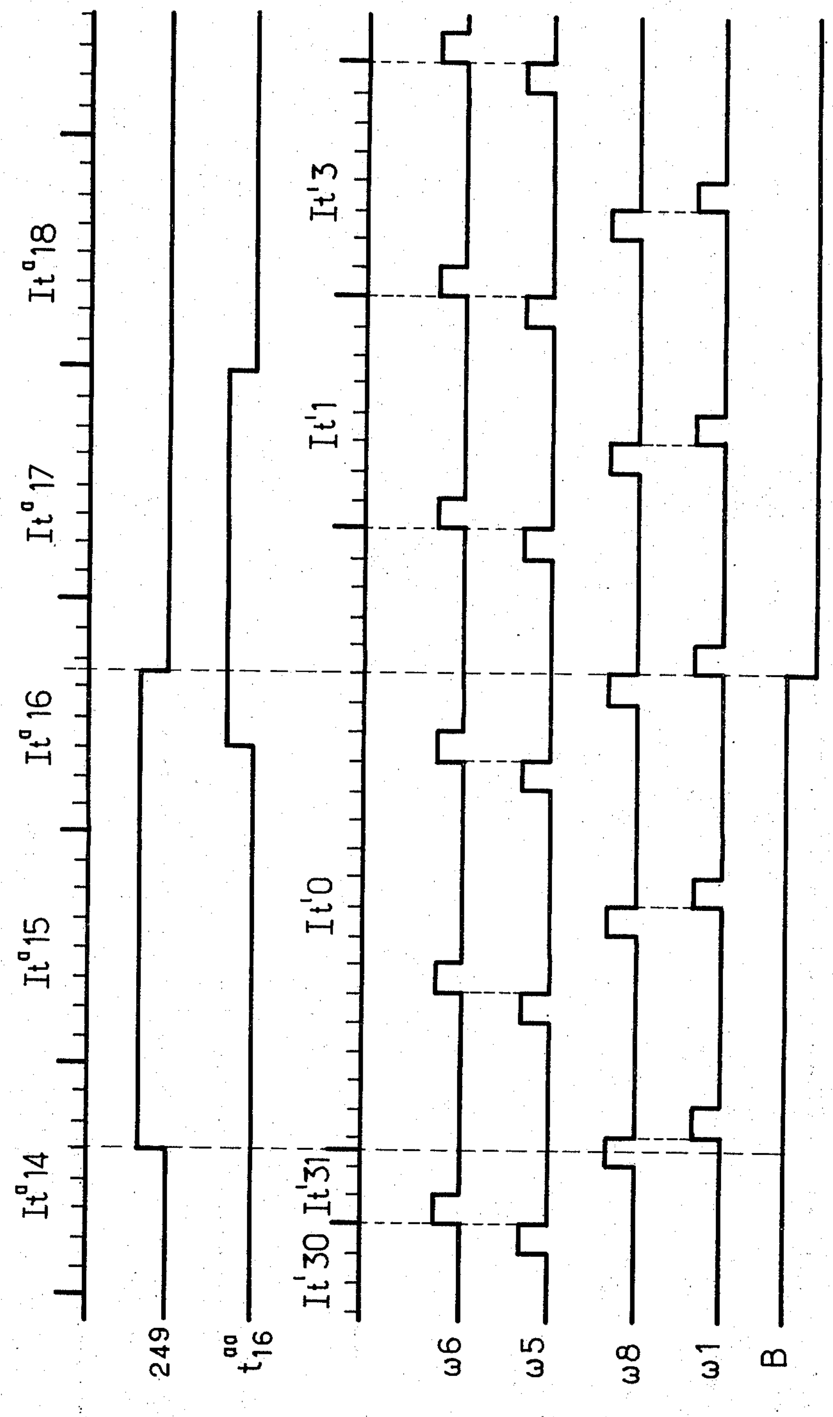
Figure 6C:
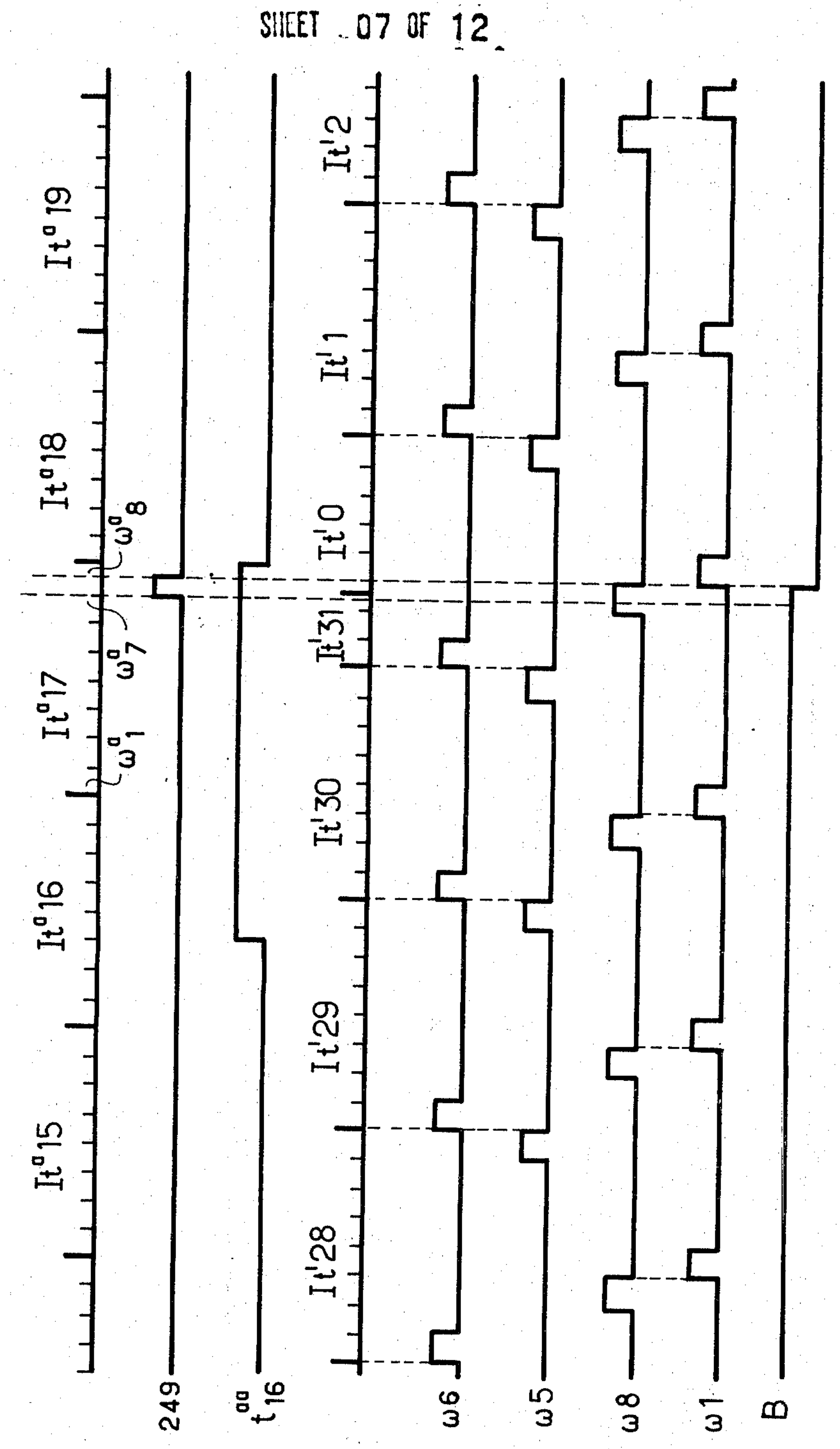

FIGS. 3*a*, 3*b*, 3*c* show the contents of a multiframe in various cases of transmission;

FIG. 4 shows the control circuits for the frame and multiframe locking or syne words, also enabling the recovery of the distant time base;

FIG. 5*a* shows a diagrammatic drawing of the synchronizing device for the speech channels, subsequently transmitted towards the connection network; the circuits shown in FIGS. 5*b* and 5*c* are annex circuits;

FIGS. 6*a*, 6*b*, and 6*c* each show a diagram in time of the various signals coming into play in resynchronizing in three different cases;

FIGS. 4, 5*a*, 5*b*, 5*c*, 6*a*, 6*b* and 6*c* show the synchornizing of the speed frames, multiframes and channels. The devices referred to in these two figures belong to the group of synchronizing equipment according to the invention.

The following figures relate the synchronizing of the channel-by-channel and telegraph channel signalling data items, which are necessary, for the monitoring of the speech channels, The group of synchronizing equipment, although it comprises several synchronizing devices, forms a whole, enabling the time-switching center to carry out the work assigned to it.

Figure 7:
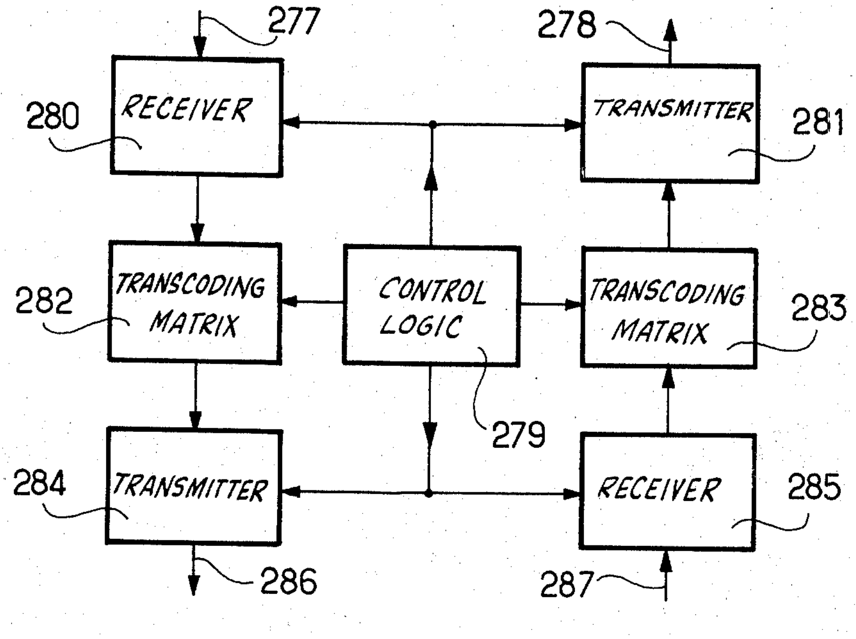
Figure 8:
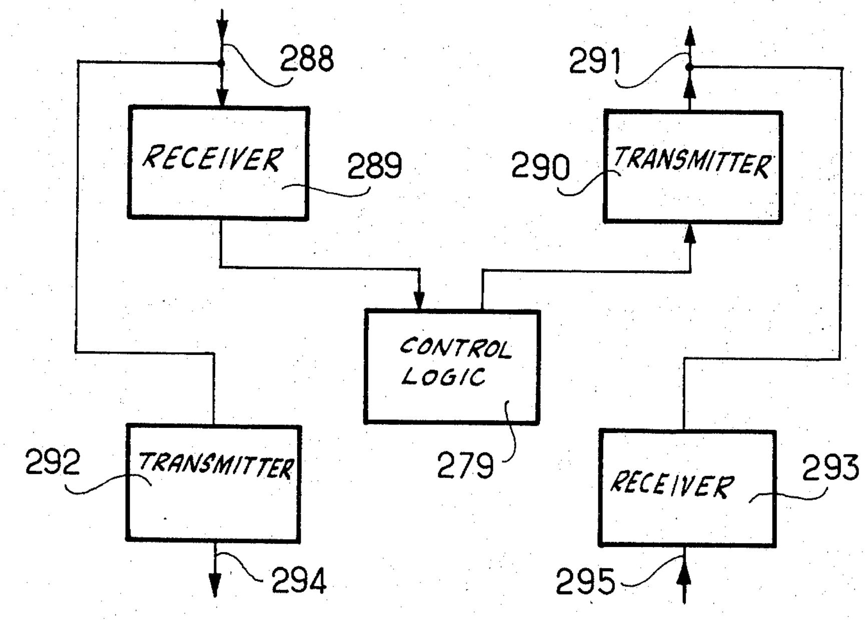
Figure 9A:
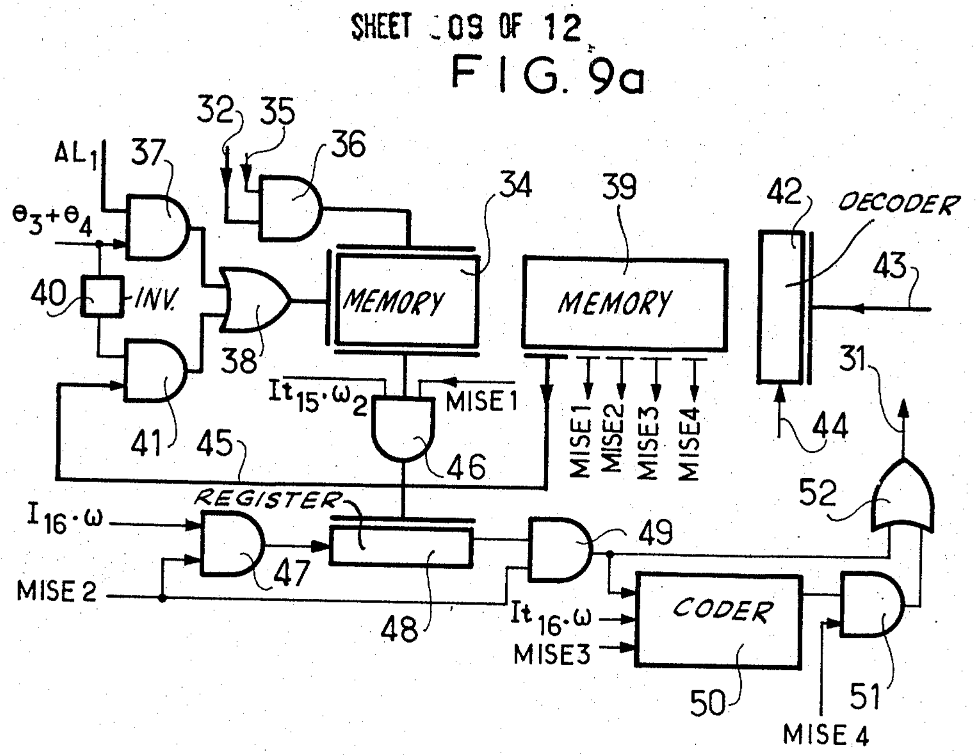
Figure 9B:
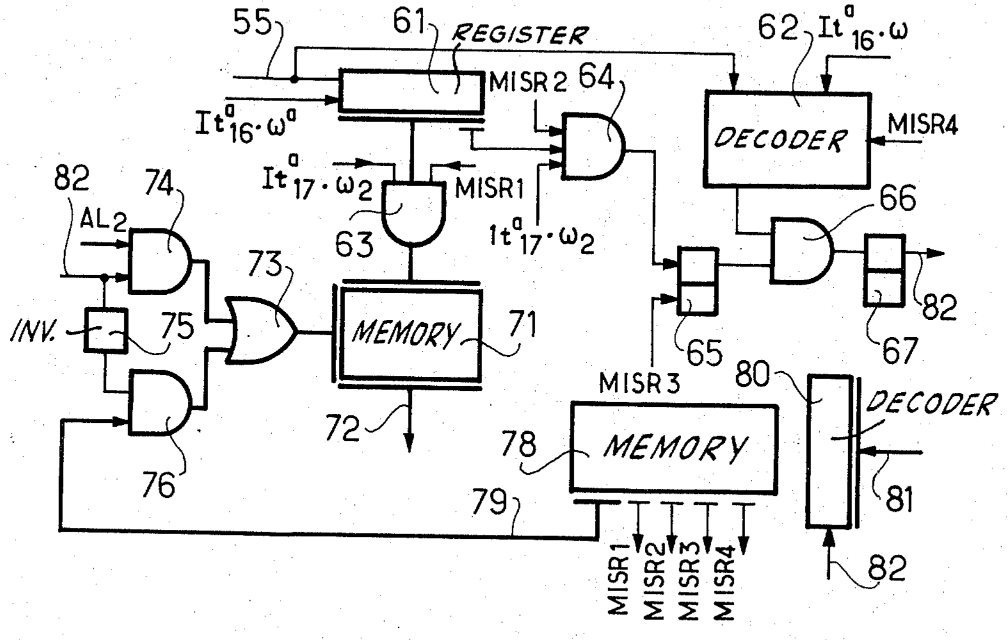
Figure 10:
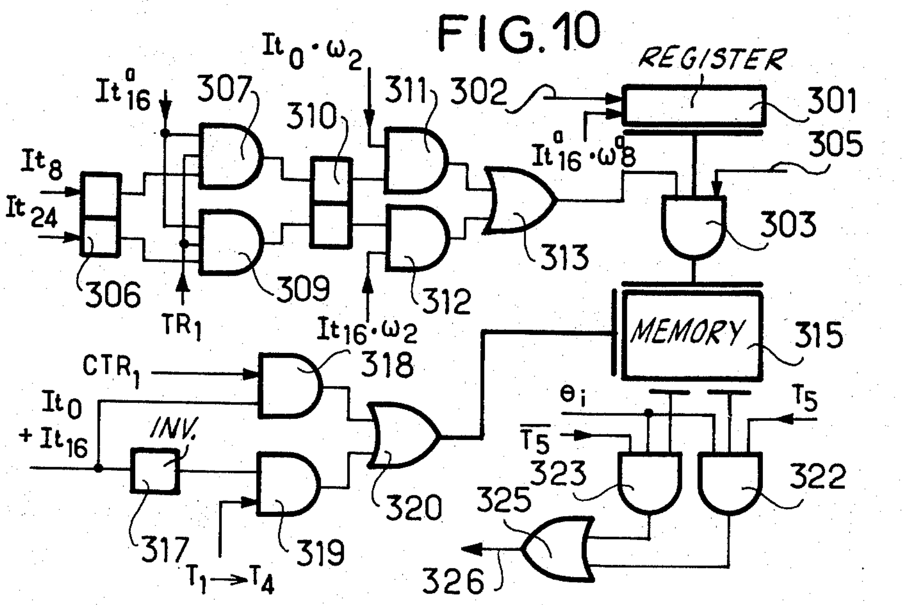
Figure 11:
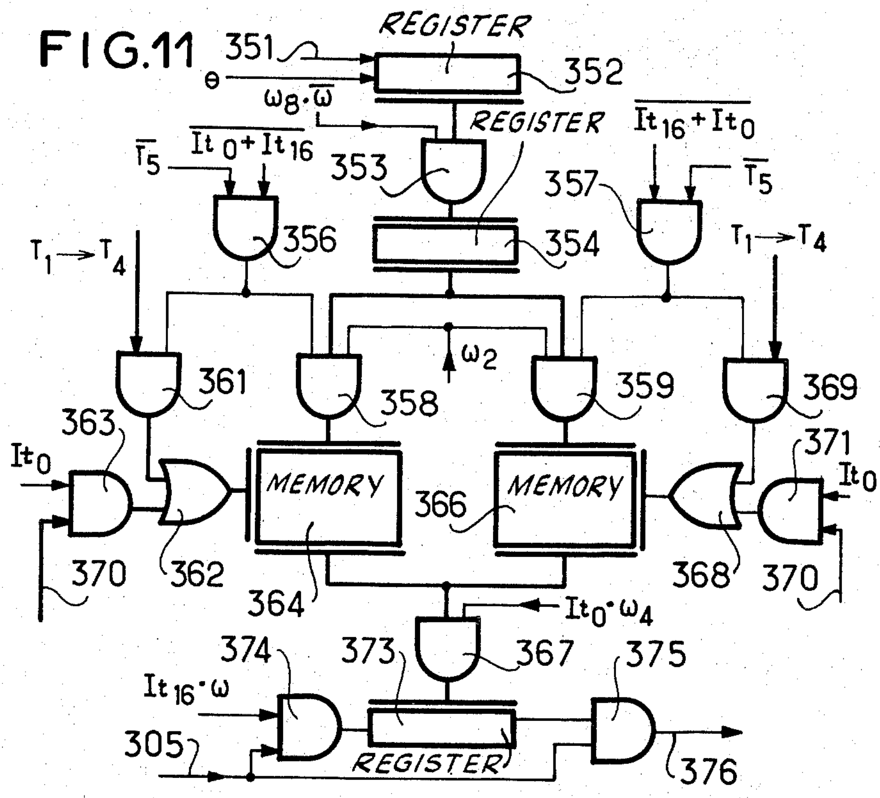
Figure 12:
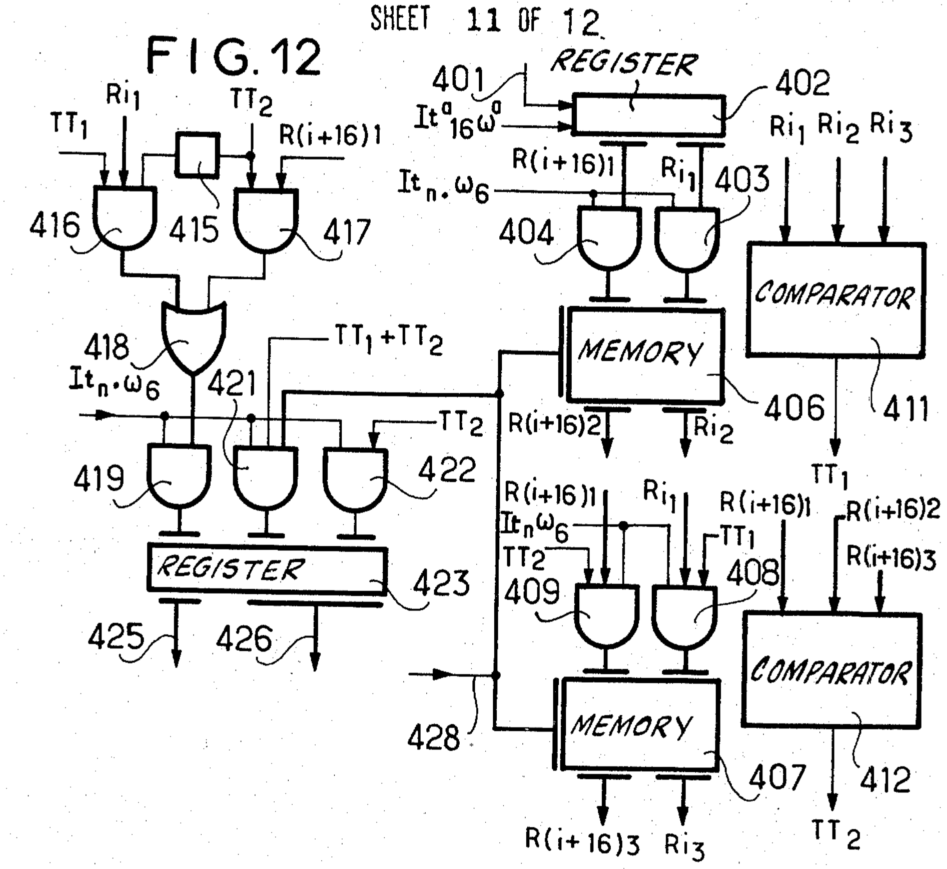
Figure 13:
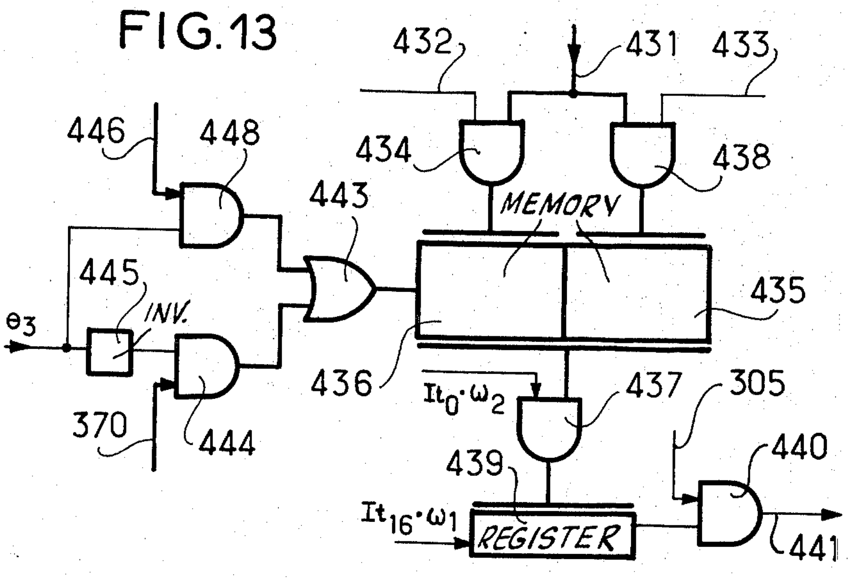
Figure 14:
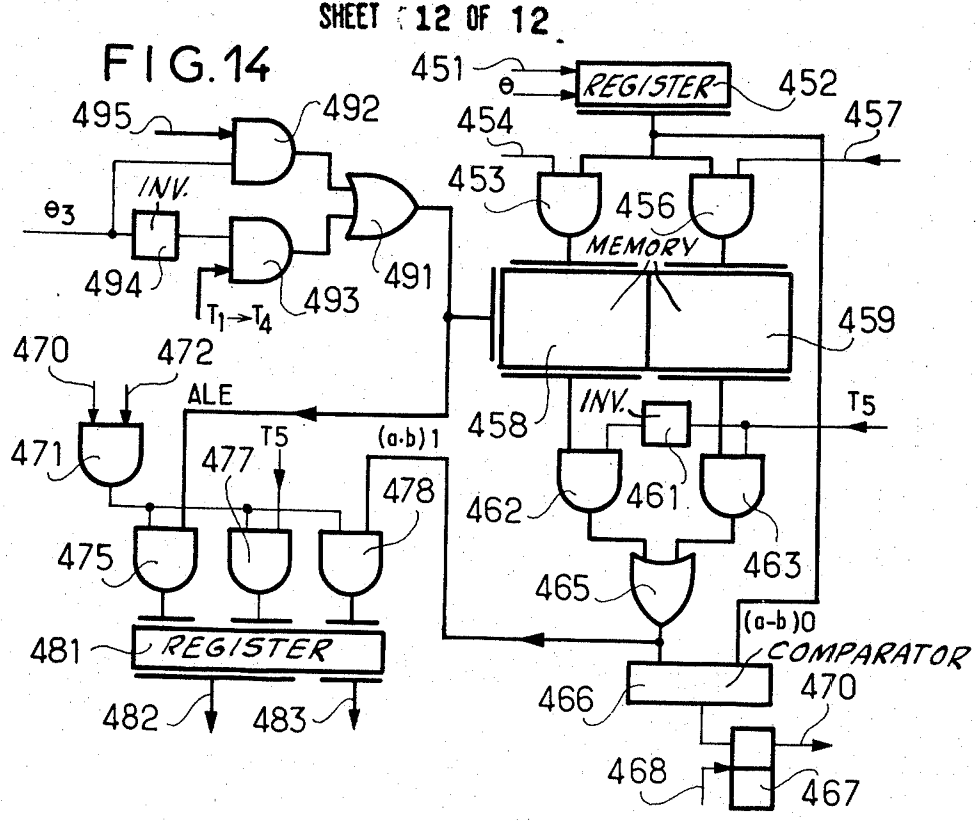
Figure 15:
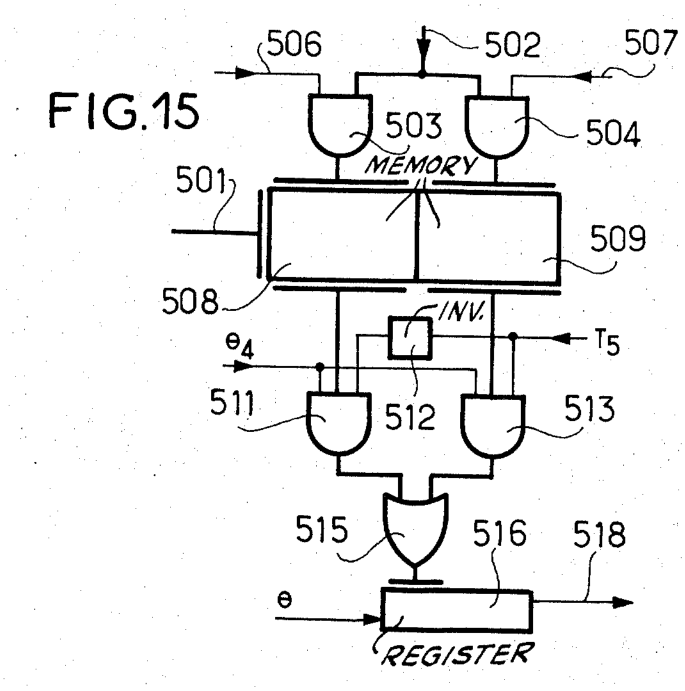

FIGS. 7 and 8 show a diagram of a multiplex synchronizing module and of a satellite synchronizing module;

FIGS. 9*a* and 9*b* show the circuits enabling, respectively, the transmitting and the receiving of data items from the telegraph channel;

FIG. 10 shows the synchronizing circuit of the channel-by-channel signalling in the direction of the connection unit towards the multirecorder of the time-switching center;

FIG. 11 is a circuit having the same object as the preceding, in the opposite direction;

FIG. 12 also has for its object a synchronizing circuit for the channel-by-channel signalling coming from a distant digital terminal set;

FIG. 13 shows the circuit enabling the signalling elements to be transmitted towards a digital terminal set of inter-exchange circuits;

FIG. 14 shows the circuit for receiving signalling elements by the multiplex synchronizing module coming from the connection network;

FIG. 15 shows the circuit for transmitting data items towards the multirecorder.

Figure 1:
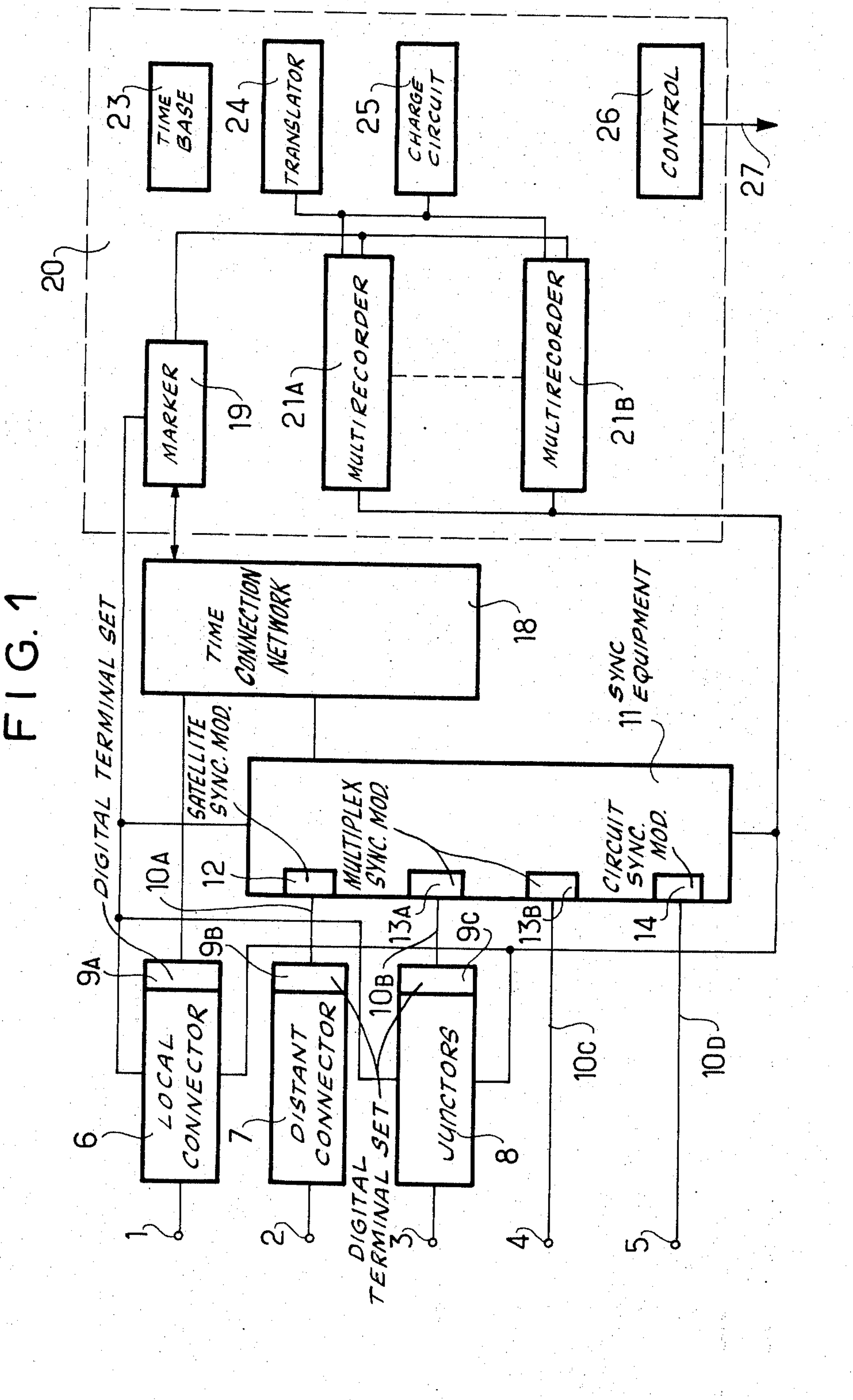
FIG. 1 shows a general diagram of the various circuits to be synchronized with a time-switching center.

FIG. 1 shows a general diagram of a time-switching center connected to various satellite units. The references 6 and 7 designate two connection units, the first being local, connected to the local subscribers' lines 1, the second being distant, connected to the distant subscribers' lines 2. The junctors 8, as a whole, are connected to inter-exchange circuits 3. The references 9A, 9B and 9C designate digital terminal sets. The connection units 7 are connected to satellite synchronizing modules 12, through multiplex lines 10A.

The multiplex synchronizing modules 13A and 13B are used either to be connected to the digital terminal sets of junctors (9C) through multiplex lines 10B, or to be connected to pulse code modulation circuits connected to an electromechanical center 4, through multiplex lines 10C.

The circuit synchronizing modules 14 are connected to pulse code modulation circuits of a distant time center 5, through multiplex lines 10D.

The synchronizing modules, as a whole, which are of three types as just described, are comprised in the group of synchronizing equipment referenced 11. The group of synchronizing equipment according to the invention comprises, in addition to the various modules shown herebelow, a speech channel synchronizing device, as well as a distant time base retrieving device. The various synchronizing devices comprised in the synchronizing equipment group are the object of the present description.

The local connection unit 6 and the group of synchronizing equipment are connected to the time connection network 18 which as the object of a patent by the applicant, filed on Dec. 23, 1966, under No. 1,511,678.

The time connection network 18, as well as the connection units 6 and 7, the junctor 8 and the synchronizing equipment group 11 are connected to the time-switching center 20 which comprises a marker 19, a series of multirecorders, two of which are illustrated and referenced 21A and 21B. The time-switching center 20 comprises, moreover, a time base 23, a translation circuit 24, a charging unit 25 and a control element 26. The latter is connected to the data-processing center, not shown, through the line 27.

A connection unit makes it possible to establish, for example, 60 communications among the 512 subscribers' sets to which it is connected. A junctor adapts the signalling of the digital terminal sets 9C to the signalling used on the interchange circuits 3. Among other functions, the purpose of a marker is to process the tests on new calls, or the tests of the states of subscribers' sets when the connecting unit or the junctor records a new call or the end of a call. These data items are transmitted by the telegraph channel in the case of distant equipment (cf. FIGS. 3A, 3B and 3C). Among other functions, the purpose of a multi-recorder is to process the channel-by-channel signalling when it is connected to a concentrator.

Figure 2:
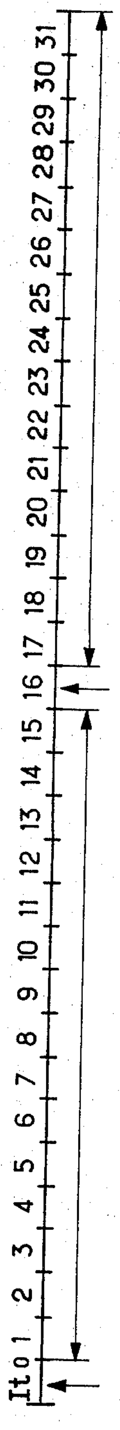
FIG. 2 shows the contents of a frame.

FIG. 2 shows a frame containing data items concerning speech. A frame whose duration is 125 us is divided into 32 time intervals, hereinafter referred to as I*t*. Each interval of time $It_i$ comprises eight binary elements according to the clock frequency. For the sake of clarity, the nth binary element ($1 \leq n \leq 8$) is references $\omega_n$; $\omega_n$ represents a clock having the same frequency as that of the I*ti*'s, but staggered by an instant equal to $n\omega$. The first interval of time, $It_o$, is used, as the following part of the description shows, for synchronizing the frame (frame sync or locking). $It_{16}$ generally comprises channel-by-channel signalling data items, or telegraph channel data items. It must be noted that, on signalling lines, in parallel with the speech lines, an $It_i$ is divided into five elementary time intervals, each comprising a binary element; these latter are repeated according to the clock $\omega$. The remaining 30 I*t*'s ($It_1$ to $It_{15}$ and $It_{17}$ to $It_{31}$ ) are 30 speech channels.

FIGS. 3*a*, 3*b* and 3*c* represent the contents of a multiframe in three different casts. The first case (FIG. 3*a* ) corresponds to a multiframe between a time-switching center and a distant connection unit. A multiframe comprises 32 frames. The $It_{16}$ of the frame *o*, TR*o*, corresponds to the multiframe synchronizing (multiframe locking). The $It_{16}$ of the frames $TR_1$ to $TR_{15}$ comprise channel-by-channel signalling data items. The $It_{16}$'s of the frames $TR_{16}$ to $TR_{31}$ comprise data items of the telegraph channel either between the connection unit and the marker of the time-switching center, or between the control element and the connection unit. The second case (FIG. 3*b*) corresponds to the case of a multiframe between two time-switching centers. In that case, except for the $It_{16}$ of TR*o*, every $It_{16}$ of the frames $TR_1$ to $TR_{31}$ correspond to the telegraph channel. The third case (FIG. 3c) corresponds to a multiframe between a time-switching center and a distant digital terminal. In that case, the multiframe comprises only 16 frames, which, except for $It_{16}$ of $TR_o$, comprises channel-by-channel signalling on the $It_{16}$ of each frame.

The present invention has for its object a synchronizing unit for distant time channels transmitted in the direction of a local time-switching center, placed at the input of the center, $n+1$ of the time channels (indices *o* to *n* ) constituting a frame and $m+1$ frames (indices 0 to *m*) constituting a multiframe, *n* and *m* being odd, the time channels comprising channels having a code related to the frame or to the multiframe of the speech channels and of the channels having various signalling data items, characterized in that it comprises a means for controlling the code related to the frame, in order to synchronize the frame with the local time base, a means for controlling the code related to the multiframe in order to synchronize the multiframe with the local time base, means for synchronizing the speech channels with the local time base, and means for synchronizing the various signalling data items.

The present invention also has for an object a synchronzing unit, characterized in that the code related to the frame is contained by the time channel O of the even frames, and called frame-locking word, the means for controlling the said code comprising a detection circuit for the distant frame-locking word, and a control circuit for the frame-locking word detected by reference to a counting means reconstituting the distant time channels. The control circuit comprises a set of bistable elements in which the combining of the states represents the various stages of the search for synchronizing, and whose final state is that corresponding to the synchronizing of the frame-locking word. Preferably, the control circuit comprises three bistable elements.

The present invention also has for its object a synchronizing unit characterized in that the code corresponding to the multiframe is contained by the $[(n+1)/2]$th time channel of the frame O of a multiframe and called multiframe locking word, and the means for controlling the code comprises a circuit for detecting the distant multiframe locking word, and a control circuit for the multiframe locking word by reference to a counting means reconstituting the distant time frames, the control circuit comprising a set of bistable elements in which the combining of the states represents the various stages of the search for synchronizing and whose final state is that corresponding to the synchronizing of the multiframe locking word. Preferably, this control circuit comprises two bistable elements.

The present invention also has for its object a synchronizing unit characterized in that a frame of time channels comprises speech channels whose indices range from 1 to $(n-1)/2$ and from $(n-3)/2$ to *n*, the means for synchronizing the speech channels with the local time base comprising two storage means M1 and M2, each containing either the first to $[(n-1)/2]$th speech channels of the frame or the $[(n+3)/2]$th to *n*th speech channels, two means for providing a first and a second signal which are, respectively, in relation to the $[(n+1)/2]$th distant time channel and the distant time channel O, delayed and prolonged, a decision circuit enabling information to be written in M1 while M2 is being read out, and vice-versa, this circuit comprising a means for counting the local time channels, a means for sending out a third signal a short interval after either the beginning of the *n*th local time channel or the beginning of the $[(n-1)/2]$th local time channel, a means for comparing either of the first signal or the second signal with the third signal at an instant following very closely to the end of the *n*th or $[(n-1)/2]$th local time channel, connected to a means changing the reading and writing state of M1 and M2, the time channels of the read memory then being in phase with the local time channels.

To great advantage, the two storage means are two addressable real time memories having $(n+1)/2$ divisions with eight binary elements each, the writing-addressing being effected according to the coded number of the distant time channels when the memory concerned is in the writing period, the reading-addressing being effected according to the coded number of the local time channels when the memory concerned is in the reading period; the means for sending out the third signal and the means changing the writing state into the reading state and vice-versa are bistable circuits.

The present invention also has for its object a synchronizing unit characterized in that the $[(n+1)/2]$th time channel of certain frames of a multiframe transmitted from the logic control element towards a connection unit, comprises signalling data items, called telegraph channel data items. The means for synchronizing the said data items comprises a means for storing the data items, connected to a register, the register being linked to a coder for the control code for the transmitting of data items which are present in the $[(n+1)2]$th time channel of the $(m-1)$th frame of the multiframe, an order memory which functions on the basis of the coded number of the transmitting frames, and sends out a succession of orders synchronizing the storage means, the said register and the said coder.

The present invention also has for its object a synchronizing unit, characterized in that the multiframe is transmitted from a connection unit towards the logic control element. The means for synchronizing the telegraph channel data items comprises a register containing the telegraph channel data items connected to a means for storing the said data items, and a decoder for the control code for the transmitting of data items, an order memory which functions on the basis of the code number of the receiving frames, and sends out a succession of orders synchronizing the said register, the said decoder and the said storage means.

The present invention also has for its object a synchronzing unit characterized in that, the $[(n+1)/2]$th time channel of certain frames of a multiframe are transmitted in the direction of a local time-switching center from a connection unit comprising signalling data items, called channel-by-channel signalling data items, the means for synchronizing the data itmes comprising a means for storing signalling data items stored at an instant between two local time channels, the one having indices $i$, $1 \leq i \leq (n-1)/2$, the other having indices $j$, $(n-3)/2 \leq j \leq n$ and being read according to the clock used for the signalling lines.

The present invention also has for its object a synchronizing unit characterized in that when the channel-by-channel signalling data are transmitted from a time-switching center towards a distant connection unit, the means for synchronizing the data items comprises two storage means, the first containing time channels 1 to $(n-1)/2$ , the second time channels $(n-3)/2$ to $n$, connected to a register in which are recorded the signalling data items of the channel $i$ $[1 \leq i \leq (n-1)/2]$ and of the channel $i + [(n+1)/2]$, the register being read when the $[(n+1)/2]$th local time channel appears.

The present invention has as a further object, a synchronzing unit characterized in that the channel-by-channel signalling data items are transmitted from a distant digital terminal set towards a time-switching center, the means for synchronizing the data items comprising two means for storing the signalling data items storing two preceding states, two comparator circuits, the first comparing the new state in relation to the two preceding states for the channel $i$ $]1 \leq i \leq (n-1)/2]$ and the second for the channel $i + [(n+1)/2]$, the comparator circuits observing the changes in states, and a register in which the new state is recorded after a change in states, and the address of the corresponding time channel.

The present invention has, as a further object, a synchronizing unit characterized in that the signalling data items are transmitted from a time-switching center towards the digital terminal set of inter-exchange circuits, the means for synchronizing the data items comprising two storage means, the first storing in the memory the channel-by-channel signalling of the channels $i$ $[1 \leq i \leq (n-1)/2]$, the second of the channels storing $i + [(n+1)/2]$, connected up to a register in which channel-by-channel signalling data items of the channels $i$ and $i + [(n+1)/2]$ are registered, the register being read when the $[(n+1)/2]$th local time channel appears.

The present invention has, as another object, a synchronizing unit, characterized in that the channel-by-channel signalling data are transmitted from the connection network of a time-switching center towards the multiplex synchronizing module, the means for synchronizing the data comprising two storage means, the first for the channels $i$ $[1 \leq i \leq (n-1)/2]$, the second for the channels $i + [(n+2)/2]$, a comparator circuit comparing the contents of each of these memories with the new in-coming data and a register in which the data item elements and the address of the corresponding time channel are recorded when the comparison has shown that there was a change in state.

The present invention has, for still another object, a synchronizing unit characterized in that the channel-by-channel signalling data items are transmitted from the multiplex synchronizing modules towards the multi-recorder, the means for synchronizing the data items comprising two means for storage, the one for the channels $i$, $1 \leq i \leq (n-1)/2$, the other for the channels $i + [(n+1)/2]$, connected to a register in which the signalling data items for the channel $i$, then for the channel $i + [(n+1)/2]$, reach according to the clock of the signalling channels, are successively recorded.

According to an embodiment of the invention which offers great advantages, the storage means are addressable like memories, the addressing being adapted to each of the various circuits.

According to another embodiment of the invention which offers great advantages, the various circuits are formed by means of integrated circuits. Lastly, the invention is, to great advantage characterized in that $n = 31$, and in that $m = 31$.

FIGS. 1, 2, 3$a$, 3$b$ and 3$c$ have been described above for the sake of clarity. In the following description, the indices a (for example, $It_i^a$ or $\omega^a$) correspond to the distant time data items; the local time data items do not comprise special indices.

FIG. 4 shows the control circuits for the frame and multiframe locking or sync words, which enable the recovery of the distant time base. The frame-locking word (VTR) is an 8-bit code transmitted in the $It_o^a$ of each even frame. The multi-frame locking word (VTR) is an 8-bit code transmitted in the $It_{16}^a$ of the frame O of each multiframe.

The data items coming from the multiplex pulse code modulation line 102 are delivered in series from the register 101 by the clock $\omega^a$.

The decoder 103 enables the combination representing the frame-locking word on the line 104 and the combination representing the multiframe locking word on the line or wire 140 to be recognized.

The frame-locking word control circuit is, to great advantage, that which corresponds to the following description:

The signal on the wire 104 of the decoder 103 is sampled at the end of each $It_o^a$ by $It_o^a\omega_8^a\overline{\omega^a}$ (gate 109, inverter 105). The gate 106 provides the signal VTR when the locking word is recognized in the $It_o^a$ and the gate 107 provides the signal $\overline{VTR}$ when the locking word is not recognized.

A system comprising three flip-flops 123, 124 and 125 enables the coding of the six possible states of the device. These states are as follows:

| Flip-flop 123 (state of the point Q) | Flip-flop 124 (state of the point Q) | Flip-flop 125 (state of the point Q) | Definition of the state |
|---|---|---|---|
| 1 | 0 | 0 | $E_1$ — Counter synchronized |
| 0 | 1 | 0 | $E_2$ — Counter synchronized, but 1 loss of the locking word |
| 1 | 1 | 0 | $E_3$ — Counter synchronized, but 2 losses of the locking word |
| 1 | 0 | 1 | $PV_1$ — Search for the locking word |
| 0 | 1 | 1 | $PV_2$ — State of search, but 1 locking word recognized |
| 1 | 1 | 1 | $PV_3$ — State of search, but 2 locking words recognized |

The output $ES_i$ of the flip-flop 125 is at 1 during the states $E_1$, $E_2$ or $E_3$. The output $PV_i$ is at 1 during the states $PV_1$, $PV_2$ or $PV_3$.

The decoder 129, placed at the output of the nine-stage counter 128, provides the following signals: $It_o^a\ \omega_8^a$, $It_o^a$, $It^a{}_{16}\omega^a{}_8$ and TRP (even frame).

Let it be assumed that the state $E_1$ (1, 0, 0) prevails at a certain instant; the gates 116 and 122 are closed ai= 0).

At the following even frame if VTR = 1, a pulse passes through the AND-gate 117 and the OR-gate 119 at $It_o^a\ \omega_8^a$ and confirms the state of the flip-flops 123 and 124. Therefore the state $E_1$ (1, 0, 0) still exists. If VTR = 0, a pulse passes through the AND-gate 120 and the OR-gate 121 and the flip-flop system 123, 124 and 126 changes over from the state $E_1$ to the state $E_2$.

The system being in the state $E_2$, if, at the following even frame, the frame-locking word is not recognized, a further pulse (signal $\overline{VTR}$) at $It_o^a\omega_8^a\overline{\omega^a}$ passes through the AND-gate 120 and the OR-gate 121; the system changes over to the state $E_3$. The system being in the state $E_3$, two further cases may occur in the following even frame. A frame-locking word is recognized (VTR = 1 during the $It_o^a\omega_8^a\overline{\omega^a}$) and a further pulse passes through the AND-gate 120 and the OR-gate 121 and makes the system change over to the state (0, 0, 1), and $PV_i$ changes over to 1, $ES_i$ changes over to 0.

This new state is a transient state, and does not last, for before the end of the signal $\overline{VTR}$ (the $It_o^a\omega_8\ {}^a\overline{\omega^a}$ lasts 250 ns), $PV_i$, which has changed over to 1, opens the AND-gate 116 (the AND-gate 117 closes, $ES_i$ changes over to 0), and the signal $\overline{VTR}$ passes through the AND-gates 113, 115 116, 119 and makes the flip-flop 123 change over to the state 1, 124 change over to the state 0 and 125 change over to the state 1.

The transient state lasts only a few nanoseconds (this being practically negligible). In practice, the system, therefore, changes over from the state $E_3$ to the state $PV_1$.

In the state $PV_1$, the AND-gate 127 is open, for it has, as its inputs 1 and 1, and the signal $ACT_1$ places the counter 128 in the state $It_o^a\omega_8^a$TRP. That state will be permanent as long as a frame-locking word has not been recognized. It is important to note that the search for the frame-locking word is effected at every $\overline{\omega^a}$ : $It_o^a\omega_8^a$ is permanently in the state 1 at one of the inputs of the AND-gate 109; the signal $\overline{\omega^a}$ can therefore permanently test the state of the wire 104 of the decoder 103.

It should be noted that that circuit offers very great advantages, for as soon as there is a loss of sync or locking, ($PV_1$ = 1 and, therefore, $PV_i$ = 1), the system tests, at each $\omega$, the existence of the frame-locking word. As soon as a locking word is recognized, VTR = 1, and a signal passes through the AND-gate 122 and the OR-gate 121, and the system, therefore, changes over from the state $PV_1$ to the state $PV_2$; then the signal $ACT_1$ is no longer active and releases the counter 128.

In the state $PV_2$, three situations may occur.

1. A frame-locking word is recognized in the following even frame, a pulse passes through the AND-gate 122 and the OR-gate 121 and makes the system change over from the state $PV_2$ to the state $PV_3$. (2) The frame-locking word is not recognized in the following even frame, a pulse passes through AND-gate 113, OR-gate 115, AND-gate 116 and OR-gate 119, and makes the system change over from the state $PV_2$ to the state $PV_1$ (where the process begins again). (3) A frame-locking word is inserted in an odd frame, a pulse passes through AND-gate 112, OR-gate 115, AND-gate 116 and OR-gate 119, and the system also returns to the state $PV_1$.

In the state $PV_3$, the three preceding cases may again occur.

(1) A frame-locking word is recognized in the following even frame, a pulse passes through AND-gate 122 and OR-gate 121 and makes the flip-flop system change over from the state $PV_3$ to a transient state (0, 0, 0), $ES_i$ = 1. That state, (like the transient state seen previously) lasts only a few nano-seconds, for as soon as $ES_i$ is in the state 1 (AND-gate 117 opens, AND-gate 116 closes, $PV_i$ changes over to 0), the pulse VTR is not terminated and may pass through the AND-gate 117 and the OR-gate 119 to place the flip-flop 123 in the state 1 and make the system change over to the state $E_1$. Therefore, in practice, the system changes over, in fact, from the state $PV_3$ to the state $E_1$.

(2) The frame-locking word is not recognized in the following even frame, a pulse passing through AND-gate 113, OR-gate 115 and AND-gate 116 and OR-gate 119 makes the system change over from the state $PV_3$ to the state $PV_1$.

(3) A frame-locking word is inserted in an odd frame, a pulse passes through AND-gate 112, OR-gate 115, AND-gate 116, OR-gate 119, and the system also returns to the state $PV_1$.

The multiframe locking word control circuit is, to great advantage, formed as follows. The system comprising two flip-flops 144 and 145 enables the coding of the three possible states:

| Flip-flop 144 | Flip-flop 145 | |
|---|---|---|
| 1 | 0 | Frame counter synchronized |
| 1 | 1 | Frame counter synchronized, but 1 loss of locking |
| 0 | 1 | Search for the locking word |

Let it be assumed that, at the outset, the synchronized state prevails, the flip-flops being in the state (1, 0). At the following multiframe, two situations may occur.

(1) VMTR = 0 at $TR_o^a It_{16}^a \omega_8^a$. The point Q of 145 changes over to 1 on the rising edge of the clock $TR_o^a It_o^a \omega_8^a \overline{\omega^a}$; on the other hand, the flip-flop 144 remains at 1, for, on the rising edge of the clock, the output of the AND-gate 142 preceded by the inverter 141 is at 0, this providing at the data input of the flip-flop 144, a 1, after passing through the inverter 143. A loss of multiframe locking has, therefore, made the system change over from the state (1, 0) to the state (1, 1).

(2) VMTR = 1 at $TR_o^a It_{16}^a \omega_8^a$. On the rising edge of the clock $TR_o^a It_{16}^a \omega_8^a \overline{\omega^a}$ (AND-gate 147), the data input at 145 is at 0, the input 144 is at 1, and the system remains in the original state (1, 0).

If the system is in the state (1, 1), two situations may also occur at the following multiframe.

(1) VMTR = 0 at $TR_o^a It_{16}^a \omega_8^a$. On the rising front of the clock $TR_o^a It_{16}^a \omega_8^a \overline{\omega^a}$, the flip-flop 144 changes over to 0, and 145 changes over to 1, this corresponding to the locking word search state. The signal $ACT_2$ permanently presents the counter 149 in the state $TR_o^a$. The search for the frame-locking word is then effected in the $It_{16}^a$ of each frame. The counter 149 followed by the decoder 151 is unblocked only by the existence of the signal VMTR in the frame $TR_o^a$ at $It_{16}^a \omega_8^a$, the flip-flops 144 and 145 then changing over from the state (0, 1) to the state (1, 0).

(2) VMTR = 1 at $TR_o^a It_{16}^a \omega_8^a$. On the rising front of the clock $TR_o^a It_{16}^a \omega_8^a \overline{\omega^a}$, the system returns to the synchronized state (1, 0). It should be noted that the loss of the frame-locking word ($ACT_1$ =1) causes the loss of the multiframe locking word, for the signal $ACT_1$ sets 144 in the state 0 and 145 in the state 1.

FIG. 5*a* represents the synchronizing device for the speech channels, receiving the speech channels from a connection unit and transmitting them towards the connection network. The register 201 having eight binary states 201 receives the data items coming from the multiplex series lines (wire 202); the transfer takes place in parallel at the end of each $It_i^a$ and at $\omega_8^a$ (AND-gate 203) in a parallel-to-parallel register 204. The register 204 is connected to two addressable active memories 206 and 207. The reading addresses are constituted by the outputs of a counter 241 (input 215 of the AND-gate 212 and input 225 of the AND-gate 222), and writing addresses are constituted by the outputs corresponding to the coding of the $It_i^a$'s (input 214 of AND-gate 211 and input 224 of AND-gate 221 of the counter 128 in the frame-locking word control device (FIG. 4). The AND-gate 211 and 212 (respectively 221 and 222) are connected up to the OR-gate 210 (respectively 220). The coded outputs of the $It'_i$'s of the counter 241 provide a different coding of the local time channels from that of the $It_i$'s of the general time base, this making it thus possible, as will subsequently be seen, to double or to "miss out" a time channel.

The first 15 $It^a$'s ($It_i^a$ to $It_{15}^a$, $It_o^a$ is not considered) are written in the memory 206, whereas the 15 other $It^a$'s ($It_{17}^a$ to $It_{31}^a$, $It_{16}^a$ is not considered) are written in memory 207. The writing instant is the signal $\omega_2^a$ (AND-gates 217 and 218 connected up to the AND-gates 208 and 209 of the writing circuits).

At each $\omega_8$, the data of one of the memories, as well as the state of the counter 241 is read; the entire result is transmitted towards the connection network (output 237) with a clock $\omega$ (AND-gate 233, preceded by the OR-gate 232, register 236) for the contents of the time channels, and a clock $\theta$ for the five binary elements for the state of the counter 241 which represent the address of the time channel. The AND-gates 230 and 231 ensure the writing of one memory 206 or 207 while the other is read.

The circuit which allows the reading-writing settings of the memories 206 and 207 require the previous elaboration of the signals $t_o^{aa}$ and $t_{16}^{aa}$ which make it possible, on the one hand, to inhibit the writing of the channels $It_o^a$ and $It_{16}^a$, and, on the other hand, the indicating of the instants when the switching can be effected.

The five-stage synchronous counter (241) controlled by the local clock $\omega_6$ sends out $It'_i$'s whose duration is exactly the same as that of the $It_i$'s, except for the $It'_{16}$, $It'_0$, $It'_{15}$ and $It'_{31}$, which may have a variable duration according to the cases. The writing-reading changing or shifting operations may be effected at the end of the $It'_{31}$ and the $It'_{15}$ (decoder 242 and wires 244 and 243) intentionally reduced to a minimum duration enabling, nevertheless, the sending of corresponding data items towards the network (wire 215). Indeed, at the end of $It'_{15}$, the memory 206 is read, and the counter 241 is set in the state 16 (wire 248) by setting the flip-flop 245 in operation. The presence of a $t_o^{aa}$ (AND-gate 251) indicating the end of the writing of the memory 207 will then be tested at each $\omega_1$ and $\omega_5$ (input of the AND-gate 250). As soon as the existence of $t_o^{aa}$ is recognized, the flip-flop 252, whose outputs are A and B, changes states, shifting the writing to the memory 206 and the reading to the memory 207, then the flip-flop 245 is re-set to the rest position, thus releasing the counter, which will re-set itself to 0 (wire 249) by the setting in operation of the flip-flop 246 at the end of an $It'_{31}$.

At that instant, the memory 207 is read, and the existence of a $t_{16}^{aa}$ indicating the end of the writing of the memory 206 will be tested at each $\omega_1$ and $\omega_5$. As soon as the existence of $t_{16}^{aa}$ is recognized, the memory point 252 changes states, the writing to the memory 207 and the writing to the memory 206, then the flip-flop 246 is re-set to the rest position, releasing the counter, which will be re-set to the position 16 by the setting in operation of the flip-flop 245 at the end of an $It'_{15}$. Then the preceding process re-occurs.

The transmission of the corresponding data items to the $It'_i$s counted by the counter 241 towards the connection network (wire 260) is effected through the AND-gate 254, the other input of that gate being the clock $\omega_8\omega$ (first half of the time-gating pulse corresponding to $\omega_8$, whereas $\omega_8\overline{\omega}$ is the second half of the same gating pulse $\omega_8$, this enabling the introduction of very slight shifts) and of the counter synchronized at $\theta$.

FIGS. 5*b* and 5*c* show how the instants $t_o^{aa}$ and $t_{16}^{aa}$ are elaborated; the elements 271, 272, 273 and 274 are flip-flops; 275 and 276 are AND-gates where the inputs of the various elements are depicted in the figures and, for a visual illustration of $t_o^{aa}$ and $t_{16}^{aa}$, reference will be made, with great advantage, to FIGS. 6a, 6b or 6c.

FIGS. 6a, 6b and 6c represent the diagrams of the times of the re-synchronizing system in three different cases. In each of these figures, the first line represents the succession of the distant $It_i^a$'s; the fourth line represents the local $It'_i$'s corresponding to the local clock $\omega_6$; when the $It'_{31}$ has taken place, a short time interval later, going from $\omega_6$ to the second half of the following $\omega_8$, the $It'_o$ of the following frame appears, since the wire 249 re-sets the counter 241 to 0. That reference 240 corresponds to the output of the flip-flop 246, whose state changes again at the following $\omega_1$ or $\omega_5$. $t_{16}^{aa}$ is a distant time magnitude. The output B of the flip-flop 252, being equal to 1, this corresponding to writing in the memory 206, and to reading in the memory 207 (see the writing and reading circuits of these memories, as well as the addressing circuits, FIG. 5a ) change over to 0 when $t_{16}^{aa}$ is equal to 1 and when the signal existing at 249 changes over to 0 (AND-gate 250). After this change-over, B = 0, A = 1, corresponding to writing in the memory 207 and to reading in the memory 206.

FIG. 6b shows an example of operation when the local clock is faster than the distant clock. In that case, the gating pulse existing at 249 lasts longer ($t_{16}^{aa}$ must have appeared, and the $It'_o$ must be considerably lengthened for synchronizing to take place. It must be remembered that the $It'_o$'s do not contain any speech channels, and contain the frame-locking word, but the latter has already been used. See FIG. 4).

FIG. 6c corresponds to the case where the local clock is slower than the distant clock. In that case, which is, in fact, quite theoretical, the gating pulse 249 is very short, and the $It'_o$ is shortened, this not being a hindrance for the transmission of speech channels, according to the discussion in the above paragraph. It must be noted that, in practice, the clock deviation or "jig" phenomena do not reach, from one frame to the other, the time which an $It$ lasts. In that case, it must also be noted that the sum $It'_{31} + It'_o$ normally represents two time channels, which is a duration of 16 $i$, amounts to only 8 $i$, that is, a channel. The presentation clock $\omega_8\omega$ in the register 256 towards the connection network is situated on the outside of the $It'_o$. It is an advantage of the invention that the protection against the "jig" and deviation phenomena of the clock always remains excellent whatever the using conditions of such a circuit may be.

FIG. 7 shows the diagram of a multiplex synchronizing module. The references 277 and 278 designate the multiplex lines used in two different directions and connected up to the digital end terminal sets. The block 280 represents the receiving circuit for the signaling data items known as RON, in the form of groups of binary elements. The block 282 represents a transcoding matrix transforming the RON data items in the form of groups of two binary elements, designated (c, d). These elements (c, d), are then transmitted towards the multirecorders, at 286, by means of the transmission circuit contained in the block 284.

In the opposite direction, the signaling data items, from the connection network at 287, in the form of groups of two binary elements designated (a, b), are received by means of the circuit contained in the block 285. A transcoding matrix 283 transforms the (a, b)s into groups of four binary elements designated TRON; the TRONs are then transmitted by the transmission circuit 281 towards the digital end terminal sets through multiplex lines 278. Each of the blocks 280, 281, 282, 283, 284 and 285 is connected to the block 279, representing the control logic element described in Pat. application No. 7,124,023 filed by the applicants on June 30, 1971. The blocks 280, 281, 284 and 285 are respectively described in FIGS. 12, 13, 10 and 11.

FIG. 8 represents the diagram of a satellite synchronizing module. The references 288 and 291 represent, respectively, multiplex lines coming from and going to distant connection units.

The block 289 contains the receiving circuit for the data items of the telegraph channel, and the block 290 contains the transmitting circuit for the same data items towards the distant connection units. These two circuits are connected to the control logic element (279). Through the multiplex line 288, the channel-by-channel signaling data items are received at 292, and transmitted towards the multirecorders (lines 294). Coming from the connection network by the lines 295, the same data items are transmitted towards the distant connection units by means of the circuit contained in the block 293. The blocks 290, 289, 292 and 293 will respectively be described in FIGS. 9A, 9B, 14 and 15.

FIG. 9A shows a circuit enabling the transmitting of data items existing in the telegraphy channel (cf FIGS. 3a and 3b); that circuit transmits the data items towards a distant connection unit through multiplex lines 31, and coming from the logic control element (input wire 32). The data items are then written in the addressable live memory 34, when the order 35 is given (AND-gate 36); the writing order 35 is elaborated by the logic control element and is a function of the incoming data elements 32.

The signal AL1 controls the addressing of reading in the memory 34, at $\theta_3 + \theta_4$ (clocks of the signaling lines, AND-gate 37, OR-gate 38).

While the memory 34 is filled with data items from the telegraphy channel, the memory 39, for orders being transmitted, which is a dead memory, is inhibited by means of the signal 44. That order memory 39 has for its input the coded number of the transmission frames (43), decoded by means of the decoder 42. The order memory 39 then supplies the orders MISE 1, MISE 2, MISE 3, MISE 4, which are a function of the arrival instants of the transmission frames which are used for synchronizing the transmission circuit presently described. Each MISE is a signal equal to 1 throughout the duration of certain transmission frames. The order memory 39, which enables great flexibility of operation, also provides the reading addressing order of the transmission memory 34. The reading addressing of the memory 34 is effected at $\theta_3 + \theta_4$ (inverter 40, AND-gate 41).

Writing being effected at 34 and the memory 49 no longer being inhibited, the contents of the memory 34 are then transferred to the register 48 having 16 binary elements, at $It_{15}\omega_2$, and, according to the order MISE 1 (AND-gate 46). The data items contained in the register 48 are transferred towards the multiplex line 31 at $It_{16}$ (indeed, the data items from the semaphore channel are included in the $It_{16}$ of certain frames of a multiframe) and according to the order MISE 2 (AND-gate 47). The thirtieth frame ($TR_{30}$) of the multiframe comprises a control code for the transmitting of data items.

For this reason, the signaling data items which are to be included in the $It_{16}$ of the frame 30 are subjected to a coding at 50, according to the order MISE 3. The last synchronizing control, MISE 4 (AND-gate 51), then enables the data items of the semaphore channel to be transmitted in the direction of the connection unit (wire 31, gate 52).

FIG. 9B shows the receiving circuit for data items from the telegraph channel. The data items come from a distant connection unit, by multiplex line 55, and will be sent towards the logic control unit (wire 72). The data items existing at 55 are transmitted towards the register 61 having 16 binary elements, at $It_{16}{}^{a\ a}$. The control code for the transmitting of data items existing in the $It_{16}{}^{a}$ of the frame 30 is decoded at 62, at $It_{16}{}^{a}\omega$, and according to MISR 4. That order MISR 4, as well as MISR 1, MISR 2 and MISR 3 are sent out by the receiving order memory 78, which is a dead memory; that memory is analogous to the memory 39 in FIG. 9A, and has, as its input, the coded number of the receiving frames (81), (coder 80, inhibition signal 82 of the memory 78). That memory also sends out the writing addressing 79 of the live addressable memory 71 (AND-gate 76, OR-gate 73). The reading addressing of the memory 71 is effected by means of the signal AL2 sent out by the logic control element (AND-gate 74).

The signal 82 corresponds to the inhibiting of the receiving obtained in the following manner. The first bit of the data items from the $It_{16}$ of the frame 16 of the multiframe corresponds to the existence of a message. That bit is detected at $It_{17}{}^{a}\omega_2$, and according to the order MISR 2 (AND-gate 64). The bistable element 65 then changes states when MISR 3 appears; when 65 has changed states and the control data of the $It_{16}$ of $TR_{30}$ has been detected (AND-gate 66), the bistable element 67 changes states and initiates the receiving of inhibition order 82, by means of the logic control circuit. That order, as has been described above, is used, on the one hand, for inhibiting the order memory, and enables, on the other, the reading addressing and writing addressing (inverter 75) of the live memory 71.

The operation is then as follows. The telegraph channel data items are recorded in the register 61, and transferred to the live memory 71 at $It_{17}{}^{a}\omega_2$, and according to the order MISR 1 (AND-gate 63); when the order memory is no longer inhibited, the various orders enable the logic control element to be called, this enabling the live memory 71 to be read, and enabling the control logic element to collect, by means of data item lines 72, the data items of the telegraph channel.

FIG. 10 shows the synchronizing of the channel-by-channel signaling existing in the $It_{16}{}^{a}$s, in the direction going from the connection unit to the multirecorder of a time switching center. The data items coming from the multiplex unit (302) are taken into consideration in a series-to-parallel register having eight binary elements 301, at each instant defined by $It_{16}{}^{a}\omega_8{}^{a}$. In practice, in that case, the data elements relate to the loop state of the subscriber's set, and in that case, there is only one binary element per time channel. The corresponding $It_{16}{}^{a}$'s cannot be transmitted such as they are towards the recorders of the center, and the adapting consisting in regrouping the signaling operation of each time channel in a frame of 125$\mu$s requires a rearranging in order. The $It_{16}{}^{a}$'s are written in the memory 315 during the $It_o$ or the $It_{16}$ (AND-gates 311 and 312) of the local frame, and at the instant $\omega_2$.

The writing signal (output of the OR-gate 313 and input of the AND-gate 303) is obtained in the following manner. It is determined by $It_o\omega_2$, if the $It_{16}{}^{a}$ of the frame 1 of a distant multiframe is introduced between the local instants $It_8$ and $It_{24}$ (flip-flop 306, AND-gates 307 and 309); conversely, it will be $It_{16}\omega_2$ if $It_{16}{}^{a}$ is introduced between $It_8$ and $It_{24}$ of the local frame. This system ensures a protection of 8 × 4$\mu$s upstream, this being sufficient. The third input 305 of the AND-gate 303 is a time gating pulse reserved for channel-by-channel operation, equal to 1 from the frame 2 to the frame 15 inclusive of the idstant multiframe. The writing addressing in the memory 315 is obtained by AND-gate 318 and OR-gate 320. The AND-gate 318 has, as its inputs, $CTR_1$ (coded number of the receiving frames) and local $It_o + It_{16}$, this actually corresponding to the writing addressing (circuit 317, 319, 320) is obtained from the signal $It_o + It_{16}$ (inverter 317) and from the coded numbers $T_1$ to $T_4$ of the Its in the time switching center (the times $T_1$, $T_2$, $T_3$, $T_4$ and $T_5$ are such that the period of $T_5$ is equal to 125$\mu$s the duration of a frame, and $Ti = (Ti + 1)2$, the first half of a $Ti$ being on the binary level equal to 1, the second on a binary level equal to 0).

The reading addressing is, thus, compatible with the time base of the multirecorder of the center. The reading of the first 15 channels is then obtained while $T_5 = 0$ (AND-gate 323) synchronized with the clock $\omega i$. The reading of the following fifteen channels ($It_{17}$ to $It_{31}$) is effected while $T_5 = 1$ (AND-gate 322); the OR-gate 325 allows one or the other of these groups of data items to pass towards the recorder (326).

FIG. 11 shows the synchronizing device of the channel-by-channel signaling of a time switching center towards a distant connection unit. The data items existing in the switching line 351 connected with each time channel comprising, to great advantage, the following four binary elements: battery reversal, battery reversal cancellation, tele-charging and ringing; they are written at the frequency of the $\theta$s in a series-to-parallel register 352. The contents of that register are transferred at the end of each $It_i$ at $\omega_8\bar{\omega}$ (AND-gate 353) in the parallel-to-parallel register of four binary elements 354. The contents of that register are transferred either in the addressable live memory 364 which stores the signaling operations of the 15 channels $It_1$ to $It_{15}$, that is, in the memory 366 identical to 364 which stores the signaling operations of the last 15 channels from $It_{17}$ to $It_{31}$. The writing of $\omega_2$ (AND-gates 358 and 359) in these memories is effected at the frequency of the time channels in the divisions addressed by the five binary elements $Ti$, the coded number of the $It_i$s (AND-gates 356 and 357), whose other input is $It_o + It_{16}$).

During the $It_o$ of each frame, the memories 364 and 365 have the same reading addressing (AND-gate 363, OR-gate 362, AND-gate 371, OR-circuit 368) constituted by the coded number of the transmission frames (370), this enabling the transferring at $It_0\ \omega_4$ (AND-gate 267) of 8 bits corresponding to the channels $Iti$ and $Iti + 16$ in the parallel-to-series output register 373, which transmits, at every $It_{16}$ (AND-gate 374) reserved for channel-by-channel operation (305), its contents towards the input of the multiplex (376) (AND-gate 375). The writing addressing circuit of 364 and 366 is similar to the reading addressing circuit of the memory 315 of FIG. 7 (AND-circuits 361, OR-circuit 362, respectively OR-circuit 368 and AND-circuit 369). At the arrival in the connection unit, the $It_{16}^3$'s are subjected to exactly the opposite treatment, so that the interface with the connection unit will remain the same, whether the latter is distant or local.

FIG. 12 shows the synchronizing device for the channel-by-channel signaling by a multiplex synchronizing module coming from a distant digital terminal set. Each $It_{16}^a$ comprises 8 bits, four of which correspond to the channel $i$, the other four corresponding to the channel $i + 16$. Each group of 4 binary elements, when it is received, is designated RON, and, when it is transmitted, TRON.

The circuit described in FIG. 12 stores the binary elements RON during a multiframe, as well as the state called "confirmed" if it is the same in two successive multiframes. The comparator 411 compares $Ri_1$ with $Ri_2$ and with the confirmed state; if their states are different, there is a change in states. The conditions $$Ri_1 = Ri_2$$

$$Ri_1 \neq Ri_3$$

correspond to a change in states. The comparator circuit 412 effects the same operation for the channel $i + 16$ (output TT2).

The RONs coming from the multiplex (line 401) are inserted in the register 402 having eight binary elements. The contents of that register are transferred to the memory 406 at $It_n\omega_6$ ($It_n$ is the output of a circuit analogous to the circuits 306, 307, 309, 310, 311, 312 and 313, FIG. 10), AND-gates 403 and 404); that addressable memory then has, at its output, the preceding state R $(i + 16)_2$ and $Ri_2$.

Likewise, the memory 407 stores the confirmed state R $(i + 16)_3$ and $Ri_3$. The writing circuit of that memory is the same as that of 406 (AND-gates 409 and 408), but comprises, moreover, the result of the tests made in the comparators, $TT_1$ and $TT_2$. The addressing of these memories is effected by the coded number of the receiving frames (wire 428), as in FIG. 10.

The combination $Ri_1 = Ri_2$ with $Ri_2 \neq Ri_3$ causes the calling of the logic control element, the address of the time channel (426) being made available to the latter, as are the contents of the new confirmed state of the RON element (425) in the register 423 (4 binary elements for the RON and 5 for the address).

The register 423 is filled as follows. The AND-gate 416 has, as its inputs, $TT_1$, $Ri_1$ and $\overline{TT}_2$, and allows the recording of $Ri_1$ at $It_{n\,6}$ (AND-gate 419) only if $TT_1$ has shown that $Ri_1$ was confirmed, whereas the AND-gate 417 enables the recording of R $(i + 16)_1$ also confirmed ($TT_2$) (priority circuit, $TT_1$ passes before $TT_2$, by means of the inverter 415). The address of the corresponding time channel is recorded in 423 when $TT_1$ or $TT_2$ is equal to 1 (confirming of the states), at $It_n\omega_6$ and according to the coded number of the transmission frames (428). The binary element whose weight is the heaviest is recorded only from the test $TT_2$ (AND-gate 422) onwards, for it corresponds to a confirmed RON of a channel $i + 16$ (the four low value binary elements being the same, whether a channel $i$ or a channel $i + 16$ is concerned).

FIG. 13 shows the circuit enabling the signaling elements to be transmitted towards a digital terminal set of inter-exchange elements. The TRONs (wire 431) are stored in 436, for the channels $i + 16$ (presentation element 432, AND-gate 434), and, for the channels $i$ (presentation element 433, AND-gate 438), in the memory 435. The elements having two channels $i$ and $i + 16$ are read at $It_o\omega_2$, local clock (gate 437) and recorded in the register 439 having eight binary elements; they are then transmitted towards the multiplex element (wire 441), by means of the AND-gate 440, according to the clock $It_{16}\omega_1$. The signal existing at 305 is the channel-by-channel time gating pulse, and in that case, is equal to 1 for all the frames, except the frame 0. The addressing of the memories is effected in an analogous way to the addressing of the memory 315 (FIG. 10). The writing addressing (circuit 448, 444, 445,443) is effected according to the clock $\theta_3$, and at the frequency of the coded numbers of the reading transmission frames (wire 370). The reading addressing takes place at $\theta_3$ and according to the address of the time channels in the multirecorder (wire 446). the data FIG. 14 represents the receiving circuit for signaling elements using the multiplex synchronizing module, coming from the connection network. At the level of the network, and on an order from the multirecorder, thedata items concerning the channel-by-channel signaling are coded in the form of groups of data items consisting of two binary elements designated ($a$, $b$). The register 452 having two binary elements receives the elements ($a$, $b$) wire 451, at the frequency of the $\theta$s. The elements $a$, $b$ of the channels $i$ ($1 \leq i \leq 15$) are stored in the memory 458, and those of the channels $i + 16$ being stored in the memory 459. The corresponding writing signals in these memories are referenced 454 and 457 (gates 453 and 456).

The writing and reading addressing is effected by means of a circuit analogous to that in FIG. 13 (492, 493, 491 and 494); 495 represents the writing addressing; the reading addressing is effected by means of $T_1$ to $T_4$, as already described. That circuit has, as its output, the signal ALE (reading and writing addressing) used for recording the addresses of the time channels in the register 481.

The reading of the memories 458 and 459 is effected by means if the signal T5 for the choice of the memory-read (AND-gates 462, 463, OR-gate 465 and inverter 461). The result of the reading, referenced ($a$-$b$) 1 in the figure is compared with the incident elements ($a$, $b$), not stored by the comparator 466. That comparator is connected to the flip-flop 467, whose other input is a test signal 468, and initiates the calling of the logic element (signal 470), when the comparator detects a change in states.

To obtain the elements ($a$, $b$) (483) and the address of the corresponding time channels (482), the signal ALE (AND-gate 475) is recorded in the register 481, the signal $T_5$ (AND-gate 477 giving the channel data $i$ ($1 \leq i \leq 15$) or $i + 16$, and the signal ($a$-$b$)1 (AND-gate 478) at the instant when the AND-gate 471 sends out a singal obtained from the logic control element (470) and from a suitably chosen presentation instant 472.

FIG. 15 represents the circuit enabling the transmitting of the elements $c$ and $d$ towards the multirecoder. In the case of transmitting from the synchronizing equipments towards the multirecoders, the data items are transmitted in groups of two binary elements, designated $c$ and $d$. The elements dc (502) of the channels $i$ ($1 \leq i \leq 15$) are stored at 508, those of the channels $i + 16$ being stored at 509; writing is obtained by two presentation instants (506 and 507, AND-gates 503 and 504) previously chosen. The writing and reading addressing is obtained by a circuit analogous to that in FIG. 13 (reference 501), not illustrated here. The reading of one memory or the other, 508 or 509, is effected by means of the signal $T_5$ (circuit comprising AND-gates 511 and 513, OR-gate 515 and inverter 512). The elements c and d thus read are then recorded in the register 516, at $\theta$, and sent towards the multirecorder (wire 518).

The invention may be industrially applied to a unit for synchronizing the connection network of a time switching center with various satellite units (distant concentrator, local concentrators, junctors of a distant electromechanical center equipped with a digital terminal set). The synchronizing unit, which is the object of the invention, solves the entire re-synchronizing problem in the case where the time switching center is used for telephony. Synchronizing of the speech channels, of the signaling channels (channel-by-channel and semaphore channel) is effected. The synchronizing unit has the advantage of not losing any data item during the transmitting of the speech channels, and another advantage is thst it transmits signaling data items in a very reliable way and, moreover, also when the input frequency of the data items to be transmitted is greater 13, the output frequency, as for the circuit described in FIG. 13. for example.

Although the device which has just been described appears to afford the greatest advantages for implementing the invention, it will be understood that various modifications may be made thereto without going beyond the scope of the invention, it being possible to replace certain elements by other elements capable of fulfilling the same technical function therein.

What we claim is:

1. A synchronizing unit for synchronizing the time channels of multiplexed data transmitted between a distant station and a local station, said local station having a time switching apparatus, said unit being disposed at the input of said apparatus, wherein $n+1$ of said time channels constitute a data frame and $m+1$ frames constitute a multiframe, $n$ and $m$ being odd integers, and said time channels are made up of channels having a code characteristic of a frame or multiframe, speech channels and channels including signaling data items, more particularly, those for telegraph channels and channel-by-channel operation, said synchronizing unit comprising:

first means, responsive to received multiplexed data signals, and a local clock signal, for controlling the code characteristic of a frame, to synchronize the frame with said local clock signal;

second means, responsive to said received multiplexed data signals and said local clock signal, for controlling the code characteristic of a multiframe, to synchronize a multiframe with said local clock signal;

third means, coupled to said local clock signals and responsive to the received data signals, for synchronizing the speech channels within said data signals with said local clock signals; and fourth means, responsive to said received signals, for synchronizing the transmission and receìption of said data items within said time channels, wherein the code corresponding to a frame synchronization signal is contained in the initial time channel of an even frame, and wherein said first means comprises:

detection means for receiving said data signals and detecting a frame synchronization signal therein; and control means, responsive to the output of said detection means, for monitoring whether a frame synchronization signal has been detected in the initial time channel of a respective even frame, said control means including a binary decoder circuit coupled to the output of said detection means and a counting-decoder circuit coupled to said binary decoder circuit for decoding signals representative of specific ones of the time channels received, so as to control the operation of said binary decoder.

2. A synchronizing unit for synchronizing the time channels of multiplexed data transmitted between a distant station and a local station, said local station having a time switching apparatus, said unit being disposed at the input of said apparatus, wherein $n+1$ of said time channels constitute a data frame and $m+1$ frames constitute a multiframe, $n$ and $m$ being odd integers, and said time channels are made up of channels having a code characteristic of a frame or multiframe, speech channels and channels including signaling data items, more particularly, those for telegraph channels and channel-by-channel operation, said synchronizing unit comprising:

first means, responsive to received multiplexed data signals, and a local clock signal, for controlling the code characteristic of a frame, to synchronize the frame with said local clock signal;

second means, responsive to said received multiplexed data signals and said local clock signal, for controlling the code characteristic of a multiframe, to synchronize a multiframe with said local clock signal;

third means, coupled to said local clock signals and responsive to the received data signals, for synchronizing the speech channels within said data signals with said local clock signals; and fourth means, responsive to said received signals, for synchro-nizing the transmission and reception of said data items within said time channels, wherein the code correspnding to a multiframe synchronization signal is contained in the $[(n+1)/2]^{th}$ time channel of the initial frame of which a multi-frame is composed, and wherein said second means comprises:

detection means, for receiving said data signals and detecting a multiframe synchronization signal therein; and control means, responsive to the output of said detection means, for monitoring whether a multiframe synchronization signal has been detected in said $[(n+1)/2]^{th}$ time channel of the initial frame, said control means including a binary decoder circuit coupled to the output of said detection means and a counting-decoder circuit coupled to said binary decoder circuit for decoding signals representative of the initial frame in said multiframe, so as to control the operation of said binary decoder.

3. A synchronizing unit for synchronizing the time channels of multiplexed data transmitted between a distant station and a local station, said local station having a time switching apparatus, said unit being disposed at the input of said apparatus, wherein $n+1$ of said time channels constitute a data frame and $m+1$ frames constitute a multiframe, $n$ and $m$ being odd integers, and said time channels are made up of channels having a code characteristic of a frame or multiframe, speech channels and channels including signaling data items, more particularly, those for telegraph channels and channel-by-channel operation, said synchronizing unit comprising:

first means, responsive to received multiplexed data signals, and a local clock signal, for controlling the code characteristic of a frame, to synchronize the frame with said local clock signal;

second means, responsive to said received multiplexed data signals and said local clock signal, for controlling the code characteristic of a multiframe, to synchronize a multiframe with said local clock signal;

third means, coupled to said local clock signals and responsive to the received data signals, for synchronizing the speech channels within said data signals with said local clock signals; and fourth means, responsive to said received signals, for synchronizing the transmission and reception of said data items within said time channels;

wherein said speech channels occupy the time channels of a frame from the second to the $[(n-1)/2]^{th}$ and from the $[(n+3)/2]^{th}$ the nth time channel, and wherein said third means comprises:

a pair of memory circuits, each of which is coupled to the speech channel portions of the data signals, to respectively store the said second to the $[(n-1)/2]^{th}$ channels and the $[(n+3)/2]^{th}$ to the nth channels;

a pair of elements for providing first and second signals, respectively representative of the $[(m+1)/2]^{th}$ received time channel and the initial received time channel having a prescribed duration and delay; and a read-write control circuit for controlling the alternate storage and read-out of time channels into and from said memories, said read-write control circuit including:

means counting local time channels;

means for generating a third signal, an interval of time after the beginning of one of the $n$th local time channel and $[(n-1)/2]^{th}$ time channel;

means for comparing one of said first and second signals with said third signal subsequent to the termination of one of said $n$th and $[(n-1)/2]^{th}$ local time channels; and means, coupled between said comparing means and said memory circuits, for selectively changing the storage and read-out states of said memories, so that the time channels of a reading memory are in phase with the local time channels.

4. A synchronizing unit according to claim 2, wherein the code corresponding to a multiframe synchronization signal is contained in the $[(n+1)/2]^{th}$ time channel of the initial frame of which a multiframe is composed, and wherein said detection means includes means for detecting a frame synchronization signal in said received data signals, and wherein said second means further includes:

further control means, responsive to the output of said detection means, for monitoring whether a multiframe synchronization signal has been detected in said $[(n+1)/2]^{th}$ time channel of the initial frame, said further control means including a further binary decoder circuit coupled to the output of said detection means and a further counting-decoder circuit coupled to said further binary decoder circuit for decoding signals representative of the initial frame in said multiframe, so as to control the operation of said binary decoder, and further including means, coupled between the output of the binary decoder circuit of said first means and said further binary decoder, for controlling the decoding of a multiframe synchronization signal in response to the decoding of a frame synchronization signal.

5. A synchronizing unit according to claim 3, wherein said pair of memory circuits comprise a pair of addressable active memories having $[(n+1)/2]$ storage positions, each position made of 8 binary elements, and further including means for effecting write-addressing of a memory in response to a respective code for a non-local time channel, during the storage period for the memory, and for effecting read-addressing of a memory in response to a respective code for a local time channel, during the read-out period for the memory.

6. A synchronizing unit according to claim 3, wherein means for generating said third signal and said selective changing means comprise bistable circuits.

7. A synchronizing unit for synchronizing the time channels of multiplexed data transmitted between a distant station and a local station, said local station having a time switching apparatus, said unit being disposed at the input of said apparatus, wherein $n+1$ of said time channels constitute a data frame and $m+1$ frames constitute a multiframe, n and m being odd integers, and said time channels are made up of channels having a code characteristic of a frame or multiframe, speech channels and channels including signaling data items, more particularly, those for telegraph channels and channel-by-channel operation, said synchronizing unit comprising:

first means, responsive to received multiplexed data signals, and a local clock signal, for controlling the code characteristic of a frame, to synchronize the frame with said local clock signal;

second means, responsive to said received multiplexed data signals and said local clock signal, for controlling the code characteristic of a multiframe, to synchronize a multiframe with said local clock signal; third means, coupled to said local clock signals and respon-sive to the received data signals, for synchronizing the speech channels within said data signals with said local clock signals; and fourth means, responsive to said received signals, for synchro-nizing the transmission and reception of said data items within said time channels, wherein said signaling data items for telegraph channels within a multiframe of data signals to be transmitted from a logic control element provided within said local station to a connection unit, for providing data trans-mission between said local station and an external station, occupy the $[(n+1)/2]^{th}$ time channels of prescribed frames of said multiframe and wherein said fourth means comprises:

means for storing data items to be transmitted, a register connected thereto, and a coder circuit for generating a transmission control code for data items occupying the $[(n+1)/2]^{th}$ time channel of the $(m-1)^{th}$ frame of said multiframe; and a command menory, responsive to the code representative of a transmission frame, for sending out a series of command signals for synchronizing the operations said data item storing means, said register and said coder.

8. A synchronizing unit according to claim 7, wherein said multiframe is transmitted from a connection unit to said logic control element and said fourth means further comprises:

a further register storing telegraph channel data items, connected to further means for storing said data items, and a decoder circuit for controlling the code for transmission of data items; and a further command memory, responsive to the code representative of a receiving frame, for sending out a series of further command signals for synchronizing the operations of said further data item storage means, said further register and said decoder circuit.

9. A synchronizing unit for synchronizing the time channels of multiplexed data transmitted between a distant station and a local station, said local station having a time switching apparatus, said unit being disposed at the input of said apparatus, wherein $n+1$ of said time channels constitute a data frame and $m+1$ frames constitute a multiframe, $n$ and $m$ being odd integers, and said time channels are made up of channels having a code characteristic of a frame or multiframe, speech channels and channels including signaling data items, more particularly, those for telegraph channels and channel-by-channel operation, said synchronizing unit comprising:

first means, responsive to received multiplexed data signals, and a local clock signal, for controlling the code characteristic of a frame, to synchronize the frame with said local clock signal;

second means, responsive to said received multiplexed data signals and said local clock signal, for controlling the code characteristic of a multiframe, to synchronize a multiframe with said local clock signal;

third means, coupled to said local clock signals and responsive to the received data signals, for synchronizing the speech channels within said data signals with said local clock signals; and fourth means, responsive to said received signals, for synchronizing the transmission and reception of said data items within said time channels, wherein signaling data items for channel-by-channel signaling within a multiframe of data signals, to be transmitted from a connection unit provided at said local station to said local time switching apparatus, occupy the $[(n+1)/2]^{th}$ time channel of prescribed frames of said multiframe, and wherein said fourth means comprises means for controlling the synchronization of channel-by-channel data items including means for storing signaling data items, during a time interval between two respective local time channels $i$ and $j$, which occupy the intervals $1 \leq i \leq (n-1)/2$ and $(n+3)/2 \leq j \leq n$, and for reading out data items in response to a local clock signal.

10. A synchronizing unit according to claim 9, wherein signaling data items for channel-by-channel signaling within a multiframe of data signals, are transmitted from said local time switching apparatus to a distant connection unit provided at said local station, and said fourth means comprises means for controlling the synchronization of said data items including a pair of memory circuit means, one of which stores the time channels 1 to $(n-1)/2$ and the other of which stores the time channels $(n+3)/2$ to $n$, connected to a register in which are recorded the signaling data items of the channel $i$ $[1 \leq i \leq (n-1)/2]$ and of the channel $i+[(n+1)/2]$, and means for reading-out said register in response to the appearance of the $[(n+1)/2]^{th}$ local time channel.

11. A synchronizing unit according to claim 9, wherein signaling data items for channel-by-channel signaling are transmitted from a distant digital terminal set to said local time switching apparatus, and wherein said fourth means further comprises:

a pair of storage memories for storing signaling data items and for retaining the condition of a pair of preceding states therein;

first and second comparators, responsive to the states of said data items, for respectively comparing a new state thereof with respect to the pair of preceding states for the time channel $i$ $[1 \leq i \leq (n-1)/2]$ and for the time channel $i+[(n+1)/2]$; and a recording register, for storing the new state, subsequent to a change in states, together with the address of the corresponding time channel.

12. A synchronizing unit according to claim 11, wherein signaling data items are transmitted from said local time switching apparatus to a digital terminal set of inter-exchange circuits, and wherein said fourth means further comprises:

first and second storage memory means for respectively storing channel-by-channel data signals of the channels $i$, $1 \leq i \leq (n-1)/2$ and of the channels $i+[(n+1)/2]$, connected to a further register in which are recorded channel-by-channel data signals of the channels $i$ and $i+[(n+1)/2]$, and means for reading-out said further register upon the appearance of the $[(n+1)/2]^{th}$ local time channel.

13. A synchronizing unit according to claim 9, wherein signaling data items are transmitted from a connection network provided for said time switching apparatus to a multiplex synchronizing module provided at said local station, and wherein said fourth means further comprises:

first and second memory elements for respectively storing the channel $i[1 \leq i \leq (n-1)/2]$ and the channel $+[(n+1)/2]$;

respective comparator circuits for comparing the contents of said first and second memory elements with incoming received data items; and a storage register for storing said data items and the address of the corresponding time channel in response to the output of said comparator circuits indicating a change in the states of the data items.

14. A synchronizing unit according to claim 9, wherein channel-by-channel signaling data items are transmitted from multiplex synchronizing modules to a multi-recorder provided at said local station, and wherein said fourth means further comprises:

first and second memory circuit means for respectively storing the time channels $i$, $1 \leq i \leq (n-1)/2$ and the time channels $i+[(n+1)/2]$, connected to a register circuit for successively recording signaling data items of the time channel $i$ and the time channel $i + [(n + 1)/2]$, read-out in response to the clock signals of the signaling channels.

15. A synchronizing unit according to claim 14, wherein said memory circuit means are active addressable memory circuits.

* * * * *